(12) United States Patent
Lynne et al.

(10) Patent No.: US 12,032,872 B2
(45) Date of Patent: Jul. 9, 2024

(54) INTELLIGENT USER INTERFACES FOR PLAYBACK DEVICES

(71) Applicant: Sonos, Inc., Santa Barbara, CA (US)

(72) Inventors: Brandon Lynne, Santa Barbara, CA (US); Jodi Vautrin, Boston, MA (US); Edwin Joseph Fitzpatrick, III, Boston, MA (US); Jason Yore, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/957,883

(22) Filed: Sep. 30, 2022

(65) Prior Publication Data
US 2023/0096397 A1 Mar. 30, 2023

Related U.S. Application Data

(60) Provisional application No. 63/250,896, filed on Sep. 30, 2021.

(51) Int. Cl.
*G06F 3/16* (2006.01)
*G01S 11/14* (2006.01)

(52) U.S. Cl.
CPC .............. *G06F 3/165* (2013.01); *G01S 11/14* (2013.01)

(58) Field of Classification Search
CPC .......... G06F 3/165; H04N 21/472; H04S 7/00
See application file for complete search history.

(56) References Cited

U.S. PATENT DOCUMENTS

| | | | |
|---|---|---|---|
| 5,440,644 A | 8/1995 | Farinelli et al. | |
| 5,761,320 A | 6/1998 | Farinelli et al. | |
| 5,923,902 A | 7/1999 | Inagaki | |
| 5,940,073 A * | 8/1999 | Klosterman | ....... H04N 7/17354 348/E7.071 |
| 6,032,202 A | 2/2000 | Lea et al. | |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

Audio Tron Quick Start Guide, Version 1.0, Mar. 2001, 24 pages.

(Continued)

*Primary Examiner* — Eric J Yoon

(57) ABSTRACT

An example playback device is configured to (i) detect, while the graphical display is in a sleep state, that a user is proximate to the playback device, (ii) cause a graphical display to exit a sleep state and present a GUI including a list of selectable quick start icons, each quick start icon corresponding to a respective command to begin playback of respective media content, where the list does not include information identifying the respective media content, (iii) determine that a predetermined period of time has passed after causing the graphical display to exit the sleep state, (iv) update the graphical display to include information identifying the respective media content corresponding to each quick start icon, (v) detect an input selecting one of the quick start icons via the graphical display, and (vi) based on detecting the input, begin to play back the media content corresponding to the selected one of the quick start icons.

20 Claims, 26 Drawing Sheets

(56) References Cited

U.S. PATENT DOCUMENTS

| | | | |
|---|---|---|---|
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2012/0178431 | A1* | 7/2012 | Gold .............. H04M 1/72412 455/420 |
| 2015/0370323 | A1* | 12/2015 | Cieplinski .......... H04N 21/4852 345/156 |
| 2016/0026429 | A1* | 1/2016 | Triplett ................ G06F 3/165 715/716 |
| 2019/0012069 | A1* | 1/2019 | Bates ............... H04N 21/2368 |
| 2021/0392223 | A1* | 12/2021 | Coffman ............. G06F 1/1688 |

OTHER PUBLICATIONS

Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

INTELLIGENT USER INTERFACES FOR PLAYBACK DEVICES

CROSS-REFERENCE TO RELATED APPLICATIONS

This application claims priority to U.S. Provisional Application No. 63/250,896 filed Sep. 30, 2021 and titled "Intelligent User Interfaces for Playback Devices," which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
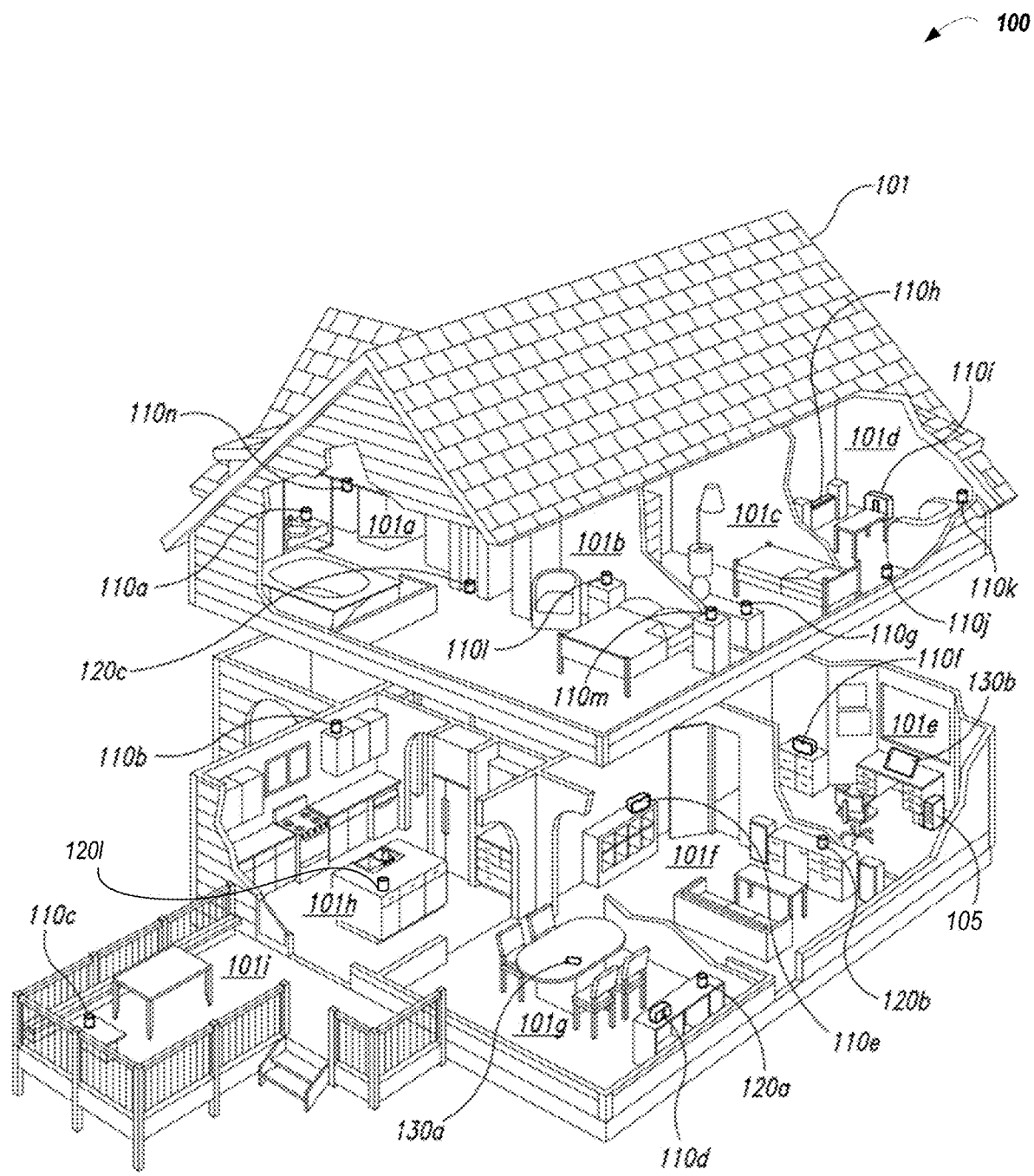
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Conventionally, hardware-based user interfaces on playback devices in a networked media playback system have provided relatively limited capabilities that are focused on simple, commonly-used controls for manipulating playback, such as volume controls (e.g., volume buttons or a volume dial), and transport controls (e.g., a play/pause button, skip forward/backward buttons). Other more advanced functionalities of the playback device, such as forming groups with other playback devices for synchronous playback, controlling the volume of other playback devices in a synchrony group, adjusting equalization settings, changing input sources, etc. are generally accessed via a separate control device, such as a smartphone that is installed with a software application for controlling playback devices in the media playback system. Further, the selection of content for playback (e.g., a given audio track, playlist, radio station, etc., from a given media content source) and the initiation of playback is typically carried out via the control device as well, or perhaps by a voice assistant if the user has elected to use one.

Sonos, Inc. ("Sonos") has been an innovator in the area of hardware user interfaces on playback devices. In 2014, Sonos filed application Ser. No. 14/338,710, which describes techniques whereby pressing a button or performing a similar action on a control interface of a first playback device (e.g., a long press of a play/pause button) causes the first playback device to join a second playback device that is currently playing back media content in the synchronous playback of the media content. U.S. application Ser. No. 14/338,710, filed Jul. 23, 2014, titled "Device Grouping," and issued as U.S. Pat. No. 10,209,947, is incorporated by reference herein in its entirety. Additional concepts beyond those specifically discussed above are disclosed in U.S. application Ser. No. 14/338,710.

In 2014, Sonos filed application Ser. No. 14/500,465, which describes techniques whereby a physical contact that traverses multiple locations on an external surface of a playback device (e.g., a "swipe") may provide a control command for a particular playback device action (e.g., a command to skip tracks). U.S. application Ser. No. 14/500,465, filed Sep. 29, 2014, titled "Playback Device Control," and issued as U.S. Pat. No. 9,671,780, is incorporated by reference herein in its entirety. Additional concepts beyond those specifically discussed above are disclosed in U.S. application Ser. No. 14/500,465.

In 2020, Sonos filed application Ser. No. 17/008,372, which describes techniques for transitioning a playback session between playback devices based on a swap trigger, including proximity detection between playback devices based on ultrasonic audio chirps. U.S. application Ser. No. 17/008,372, filed Aug. 31, 2020, titled "Ultrasonic Transmission for Presence Detection" and published as U.S. Pat. Pub. 2020/0401365, is incorporated by reference herein in its entirety. Additional concepts beyond those specifically discussed above are disclosed in U.S. application Ser. No. 17/008,372.

Nonetheless, there are some drawbacks associated with the relatively minimal hardware user interfaces discussed above. For instance, not every member of a household who uses the media playback system may have easy access to a control device, and thus their ability to access many playback device capabilities, including the selection of content and initiation of playback, is limited. Further, in situations where more advanced functionality is available via the hardware-based user interface through a specific control input (e.g., a long-press on a particular button, a swipe across multiple buttons), some users may not be aware of the specific input that must be used to access this functionality. Even in situations where more advanced device capabilities are accessible at the playback device via a voice assistant, voice command processing can be, or can seem to the user to be, unreliable or inaccurate, leading to user frustration.

Accordingly, examples herein relate to hardware user interfaces that may provide control over a broad range playback device functionality. This may increase engagement with the playback device and the media playback system as a whole and may generally provide for improved user experiences for all users in a household.

In some embodiments, for example, a playback device is provided including a graphical display, a capacitive volume control disposed on a housing of the playback device, at least one processor, a non-transitory computer-readable medium, and program instructions stored on the non-transitory computer-readable medium that are executable by the at least one processor such that the playback device is configured to (i) while the graphical display is in a sleep state, detect, via one or more proximity sensors, that a user is proximate to the playback device, (ii) based on detecting that the user is proximate to the playback device, cause the graphical display to (a) exit the sleep state and (b) present a graphical user interface (GUI) comprising a list of selectable quick start icons, each quick start icon corresponding to a respective command to begin playback of respective media content, wherein the list does not include information identifying the respective media content, (iii) determine that a predetermined period of time has passed after causing the graphical display to exit the sleep state, (iv) based on determining that the predetermined period of time has passed after causing the graphical display to exit the sleep state, update the graphical display such that the list of selectable quick start icons includes information identifying the respective media content corresponding to each quick start icon, (v) detect an input selecting one of the quick start icons via the graphical display, and (vi) based on detecting the input selecting one of the quick start icons via the graphical display, begin to play back the media content corresponding to the selected one of the quick start icons.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
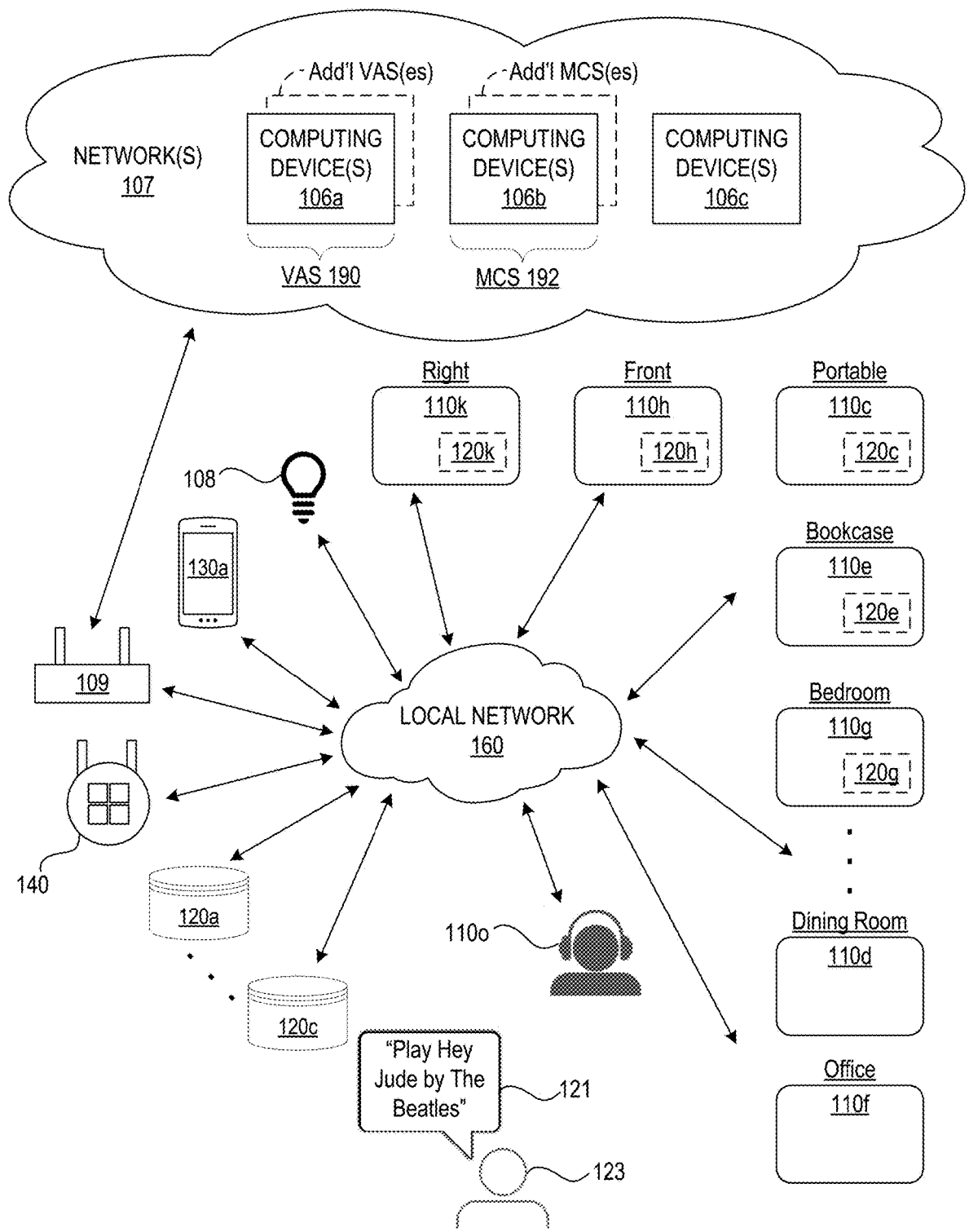
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110a-o), one or more network microphone devices ("NMDs") 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110a) in synchrony with a second playback device (e.g., the playback device 110b). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108, a smart thermostat 140, and a local computing device 105 (FIG. 1A). Numerous other examples of local network devices (not shown) are also possible, such as doorbells, cameras, smoke alarms, televisions, gaming consoles, garage door openers, etc. In embodiments described below, one or more of the various playback devices 110 may be configured as portable playback devices, while others may be configured as stationary playback devices. For example, the headphones 110o (FIG. 1B) are a portable playback device, while the playback device 110e on the bookcase may be a stationary device. As another example, the playback device 110c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more wireless personal area networks (WPANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, etc. transmitted at 2.4 Gigahertz (GHz), 5 GHz, 6 GHz, and/or another suitable frequency. Similarly, those of ordinary skill in the art will appreciate that a WPAN can refer to several different communication protocols including, for example, IEEE 802.15.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106a may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, YOUTUBE MUSIC, APPLE MUSIC, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, WPANs, telecommunication networks (e.g., an LTE network or a 5G network, etc.), and/or other suitable communication links.

In some embodiments, audio content sources may be regularly added or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to detect audio content, including voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120l may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio may be named "Portable" because it is battery-powered and/or readily transportable to different areas of the environment 101. Other naming conventions are possible.

As discussed above, an NMD may detect and process sound from its environment, including audio output played by itself, played by other devices in the environment 101, and/or sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word (also referred to herein as an activation word) associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
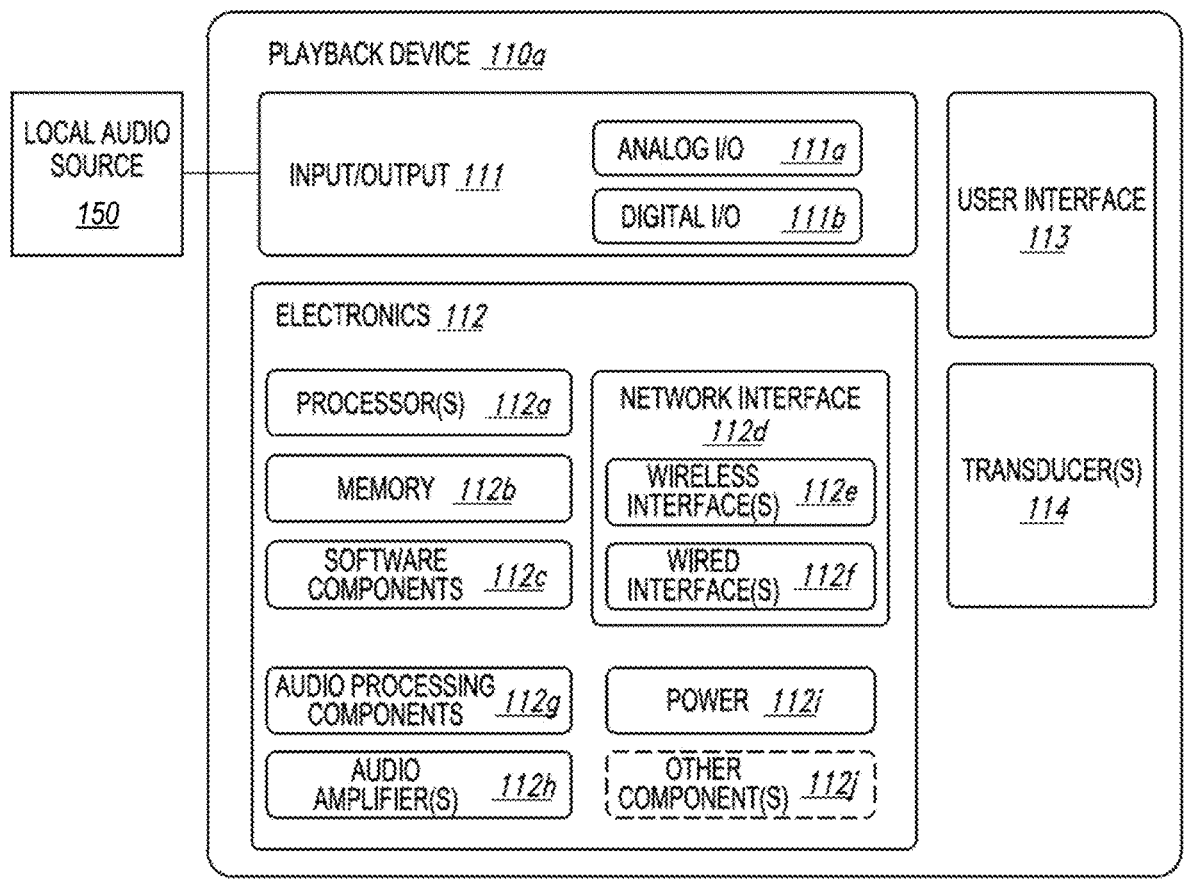
FIG. 1C is a block diagram of an example playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WIFI, BLUETOOTH, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 150 via the input/output 111 (e.g., a cable, a wire, a WPAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110*a* does not include an input/output 111 and receives all audio content via the local network 160.

The playback device 110*a* further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106*a-c* via the local network 160 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g*, one or more audio amplifiers 112*h* (referred to hereinafter as "the amplifiers 112*h*"), and power components 112*i* (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112*j* (e.g., one or more sensors, video displays, touchscreens, battery charging bases). In some embodiments, the playback device 110*a* and electronics 112 may further include one or more voice processing components that are operably coupled to one or more microphones, and other components as described below with reference to FIGS. 1F and 1G.

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112*d* is configured to facilitate a transmission of data between the playback device 110*a* and one or more other devices on a data network. The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

In some implementations, the power components 112i of the playback device 110a may additionally include an internal power source (e.g., one or more batteries) configured to power the playback device 110a without a physical connection to an external power source. When equipped with the internal power source, the playback device 110a may operate independent of an external power source. In some such implementations, an external power source interface may be configured to facilitate charging the internal power source. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more of lights (e.g., LEDs) and the speakers to provide visual and/or audio feedback to a user.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110a may include a speaker interface for connecting the playback device to external speakers. In other embodiments, the playback device 110a may include an audio interface for connecting the playback device to an external audio amplifier or audio-visual receiver.

Figure 1D:
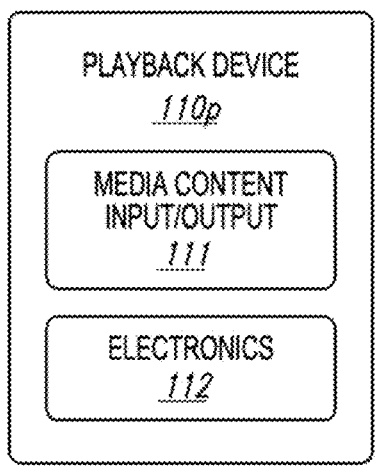
FIG. 1D is a block diagram of an example playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
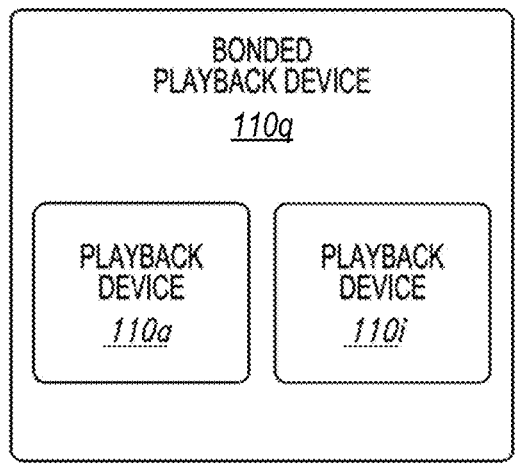
FIG. 1E is a block diagram of an example playback device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with playback device 110i, is configured to render only the mid-range and high frequency components of a particular audio content, while the playback device 110i renders the low frequency component of the particular audio content. In some embodiments, the bonded playback device 110q includes additional playback devices and/or another bonded playback device.

Figure 4:
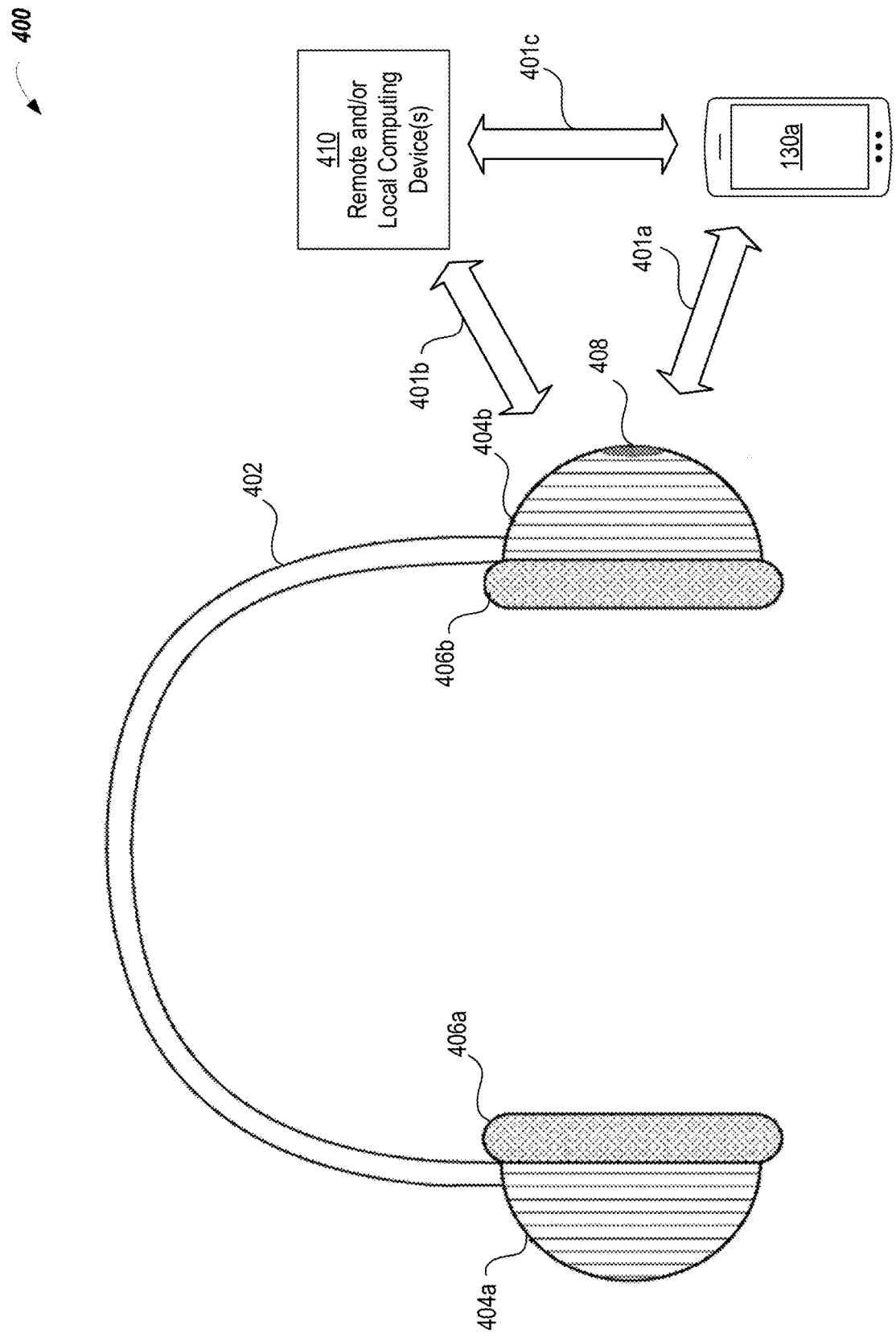
FIG. 4 is a diagram of an example playback device in the form of a headset assembly.

In some embodiments, one or more of the playback devices 110 may take the form of a wired and/or wireless headphone (e.g., an over-ear headset, an on-ear headset, or an in-ear headset). For instance, FIG. 4 shows an example headset assembly 400 ("headset 400") for such an implementation of one of the playback devices 110. As shown, the headset 400 includes a headband 402 that couples a first earcup 404a to a second earcup 404b. Each of the earcups 404a and 404b may house any portion of the electronic components in the playback device 110, such as one or more speakers. Further, one or more of the earcups 404a and 404b may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406a and 406b that are coupled to ear cups 404a and 404b, respectively. The ear cushions 406a and 406b may provide a soft barrier between the head of a user and the earcups 404a and 404b, respectively, to improve user comfort and/or provide acoustic isolation from the ambient (e.g., passive noise reduction (PNR)).

As described in greater detail below, the electronic components of a playback device may include one or more network interface components (not shown in FIG. 4) to facilitate wireless communication over one more communication links. For instance, a playback device may communicate over a first communication link 401a (e.g., a BLUETOOTH link) with one of the control devices 130 and/or over a second communication link 401b (e.g., a WIFI or cellular link) with one or more other computing devices 410 (e.g., a network router and/or a remote server). As another possibility, a playback device may communicate over multiple communication links, such as the first communication link 401a with the control device 130a and a third communication link 401c (e.g., a WIFI or cellular link) between the control device 130a and the one or more other computing devices 410. Thus, the control device 130a may function as an intermediary between the playback device and the one or more other computing devices 410, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a WPAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD)s

Figure 1F:
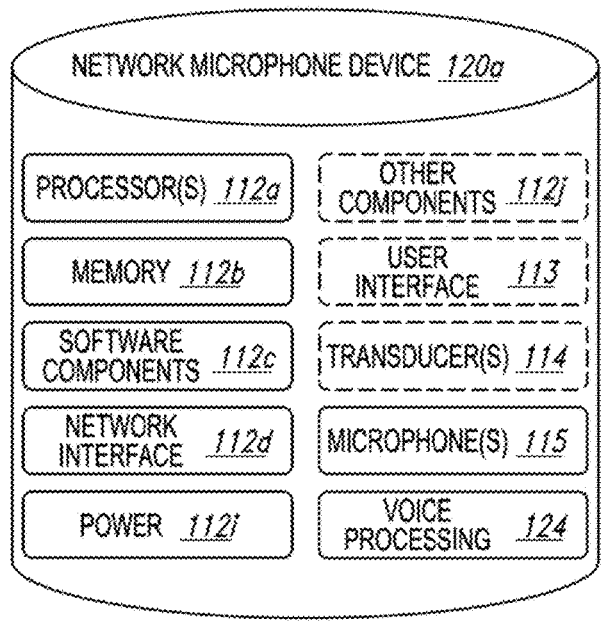
FIG. 1F is a block diagram of an example network microphone device.

FIG. 1F is a block diagram of the NMD 120a (FIGS. 1A and 1B). The NMD 120a includes one or more voice processing components 124 and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1C. In some aspects, for example, the NMD 120a includes the processor 112a and the memory 112b (FIG. 1C), while omitting one or more other components of the electronics 112. In some embodiments, the NMD 120a includes additional components (e.g., one or more sensors, cameras, thermometers, barometers, hygrometers).

Figure 1G:
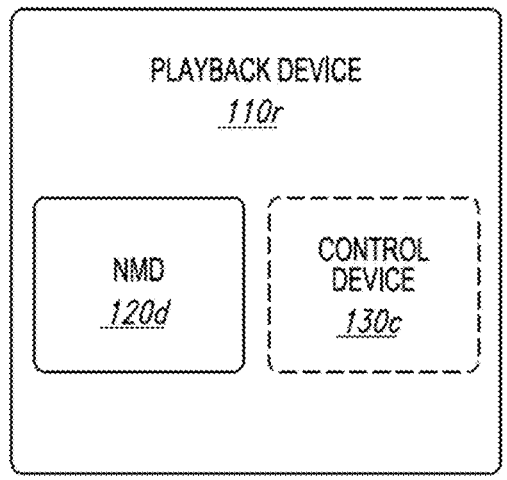
FIG. 1G is a block diagram of an example playback device.

In some embodiments, an NMD can be integrated into a playback device. FIG. 1G is a block diagram of a playback device 110r comprising an NMD 120d. The playback device 110r can comprise any or all of the components of the playback device 110a and further include the microphones 115 and voice processing components 124 (FIG. 1F). The microphones 115 are configured to detect sound (i.e., acoustic waves) in the environment of the playback device 110r, which may then be provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Patent Publication No. 2017-0242653.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The NMD 120a may use the microphone data (or transmit the microphone data to another device) for calibrating the audio characteristics of one or more playback devices 110 in the MPS 100. As another example, one or more of the playback devices 110, NMDs 120, and/or control devices 130 of the MPS 100 may by transmit audio tones (e.g., ultrasonic tones, infrasonic tones) that may be detectable by the microphones 115 of other devices, and which may convey information such as a proximity and/or identity of the transmitting device, a media playback system command, etc. As yet another example, the voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

Figure 1H:
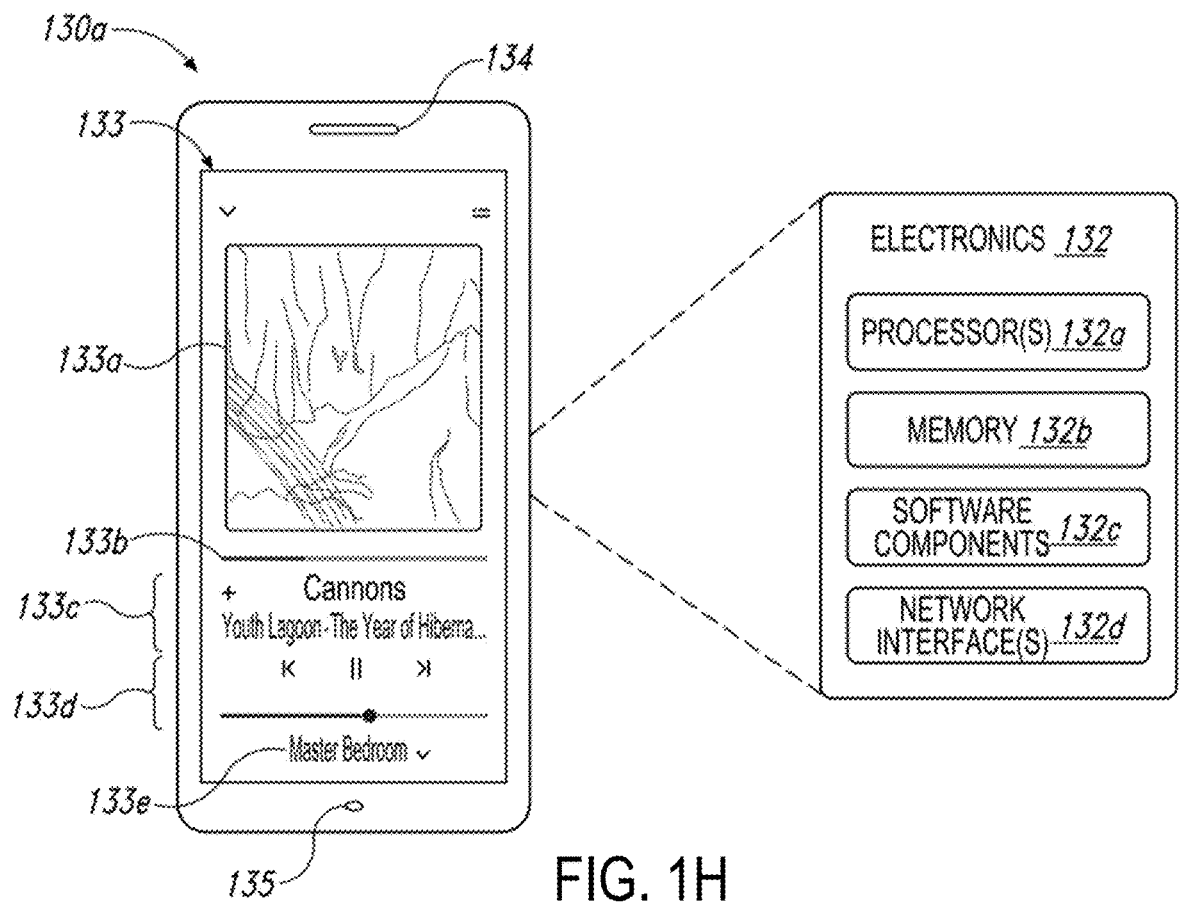
FIG. 1H is a partially schematic diagram of an example control device.
Figure 1I:
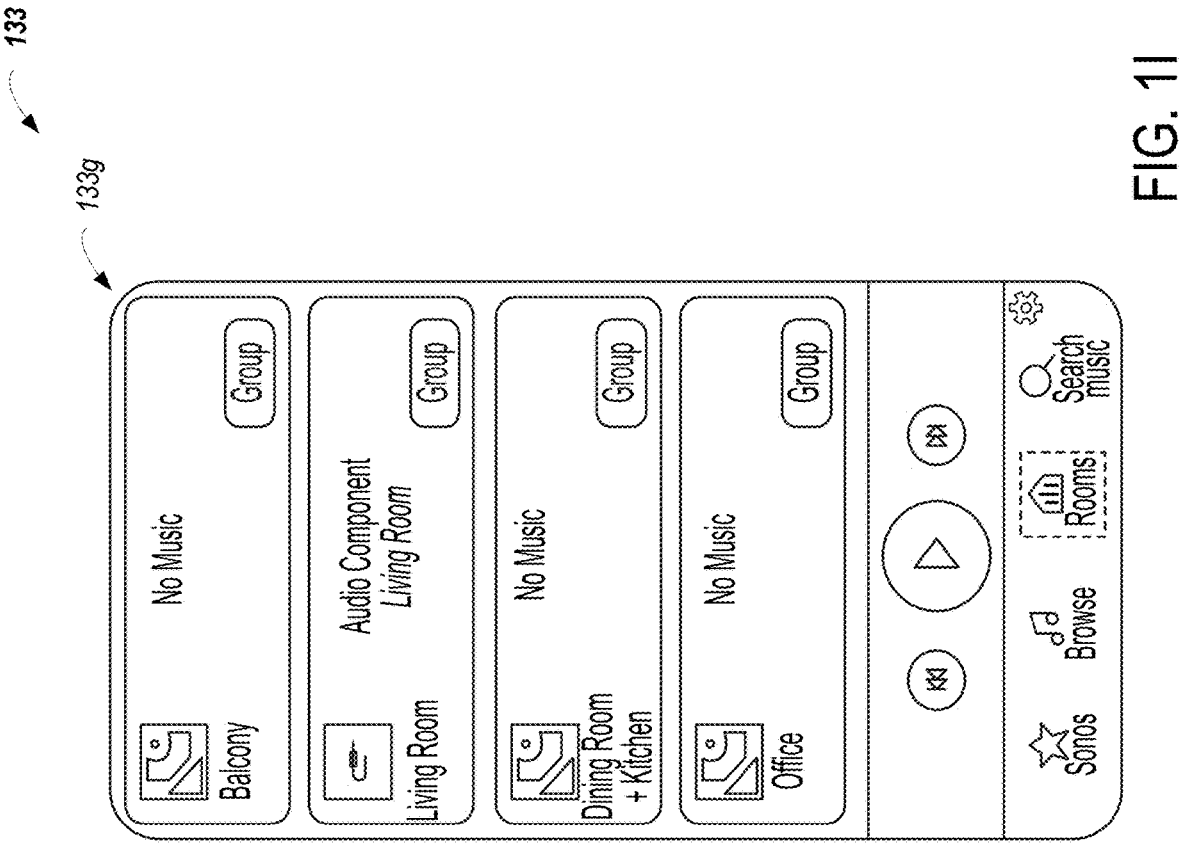
FIG. 1I is a schematic diagram of example user interfaces of the example control device of FIG. 1H.
Figure 1I:
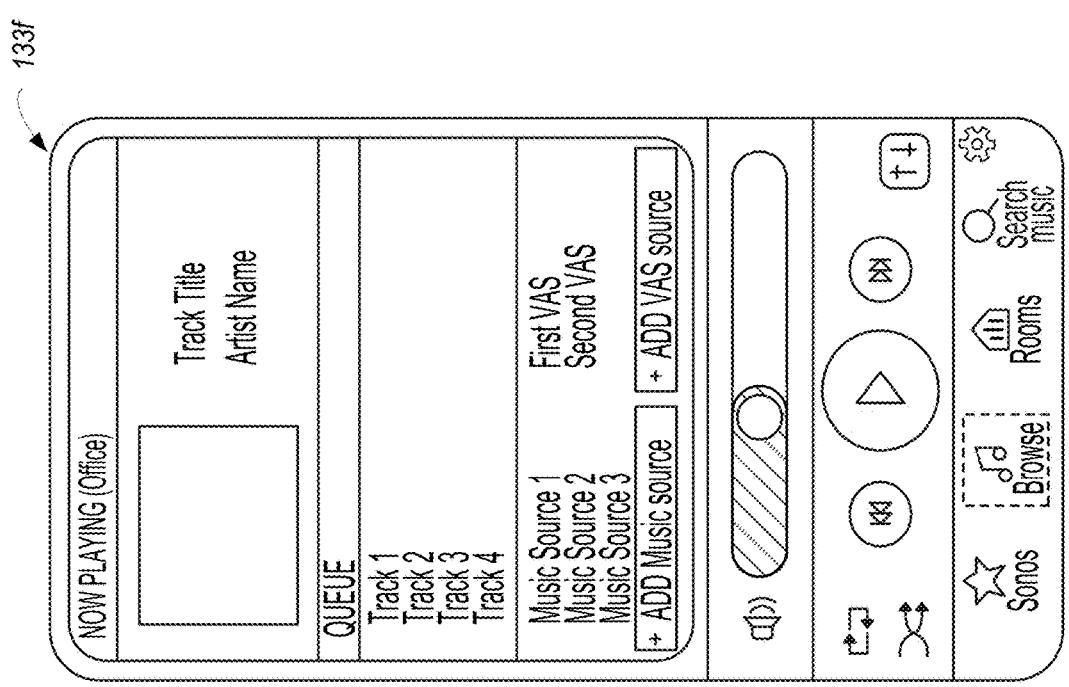

FIG. 1H is a partially schematic diagram of one example of the control device 130a (FIGS. 1A and 1B). As used herein, the term "control device" can be used interchangeably with "controller," "control device," or "control system." Among other features, the control device 130a is configured to receive user input related to the MPS 100 and, in response, cause one or more devices in the MPS 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the MPS 100. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the MPS 100. The memory 132b can comprise data storage that can be loaded with one or more of the software components executable by the processors 132a to perform those functions. The software components 132c can comprise applications and/or other executable software configured to facilitate control of the MPS 100. The memory 132b can be configured to store, for example, the software components 132c, media playback system controller application software, and/or other data associated with the MPS 100 and the user.

The network interface 132d is configured to facilitate network communications between the control device 130a and one or more other devices in the MPS 100, and/or one or more remote devices. In some embodiments, the network interface 132d is configured to operate according to one or more suitable communication industry standards (e.g., infra-red, radio, wired standards including IEEE 802.3, wireless standards including IEEE 802.11a, 802.11b, 802.11g, 802.12, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 2.

Figure 11:
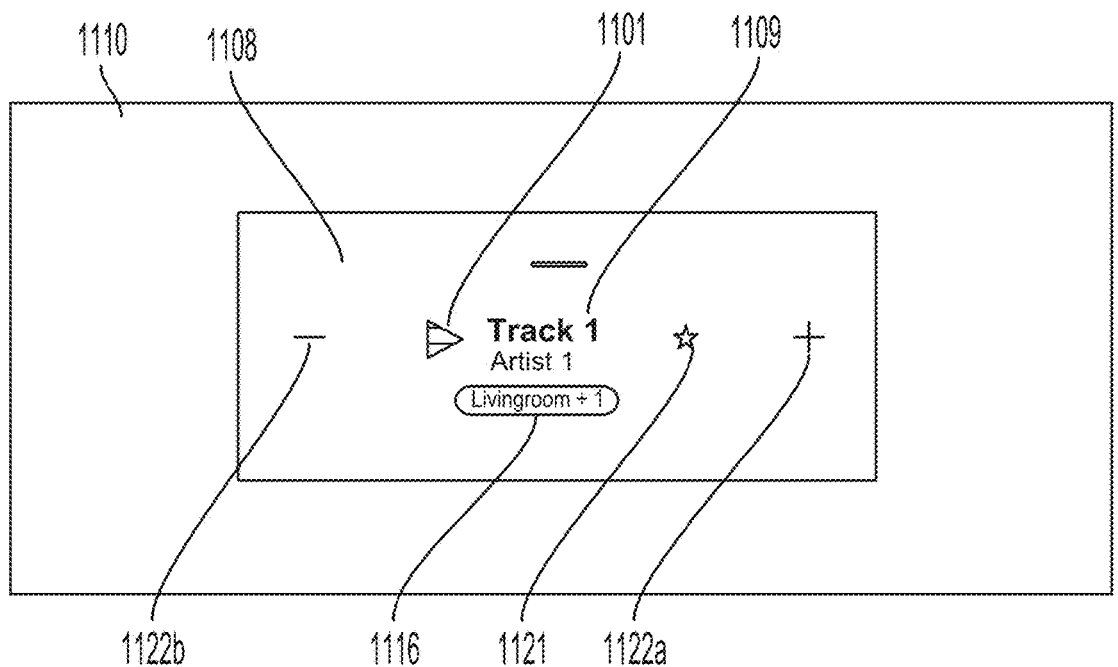
FIG. 11 is a schematic diagram of another example user interface on a playback device.

The user interface 133 is configured to receive user input and can facilitate control of the MPS 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system. FIG. 11 shows two additional user interface displays 133f and 133g of user interface 133. Additional examples are also possible.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 1J:
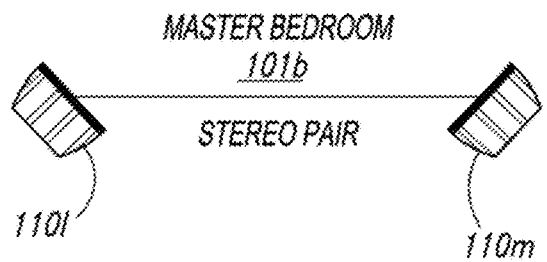
FIGS. 1J through 1M are schematic diagrams of example corresponding media playback system zones.
Figure 1K:
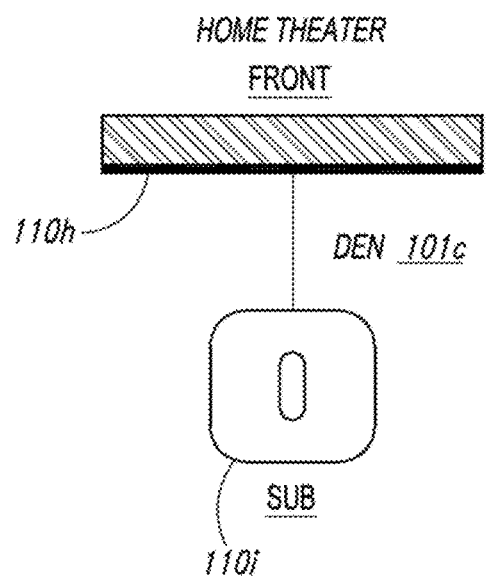
Figure 1L:
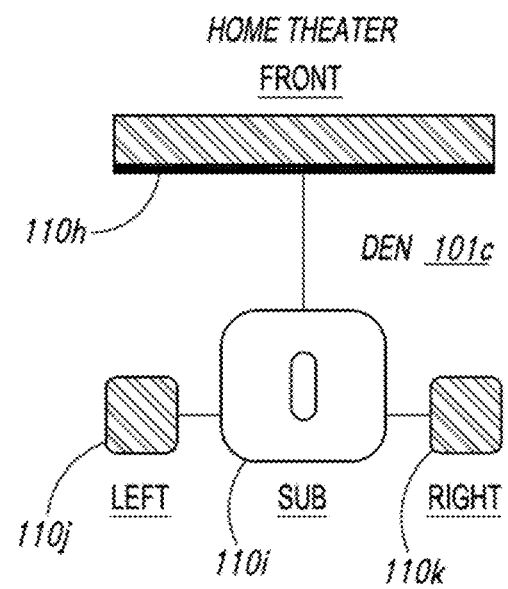
Figure 1M:
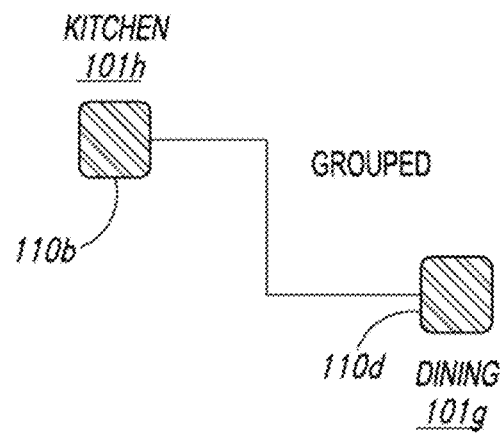
Figure 2:
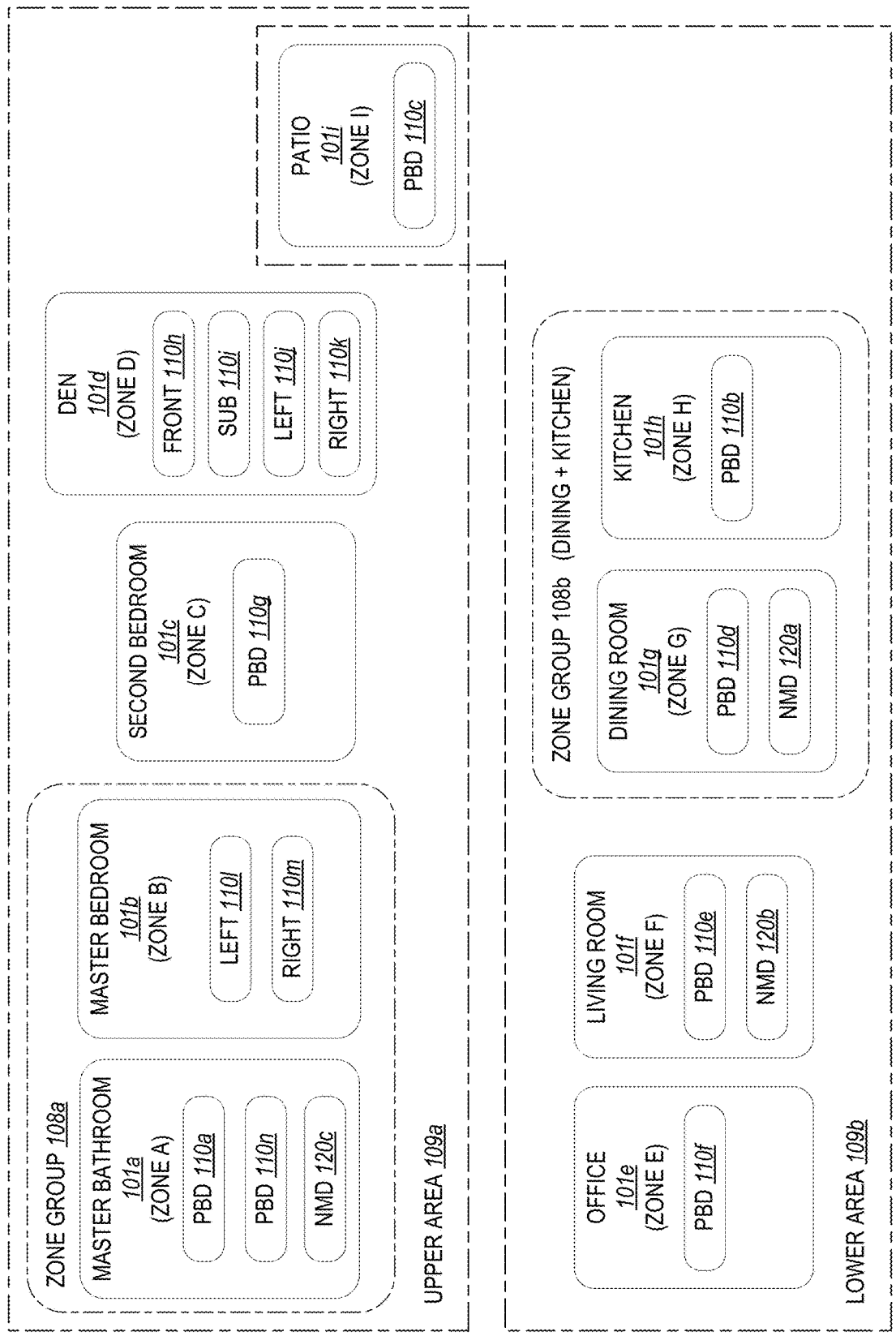
FIG. 2 is a schematic diagram of example media playback system areas.

FIGS. 1J through 2 show example configurations of playback devices in zones and zone groups. Referring first to FIG. 2, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback zones 110g and 110h can be merged to form a merged group or a zone group 108b. The merged playback zones 110g and 110h may not be specifically assigned different playback responsibilities. That is, the merged playback zones 110h and 110i may, aside from playing audio content in synchrony, each play audio content as they would if they were not merged.

Each zone in the MPS 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1L shows the Front and SUB devices 110*h* and 110*i* further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 2).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 2, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can be assigned a name such as "Dining+Kitchen", as shown in FIG. 2. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device 110*g* is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1M). Identifiers associated with the Kitchen may indicate the same or similar information by virtue of the Kitchen being part of the Dining+Kitchen zone group 108*b*. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
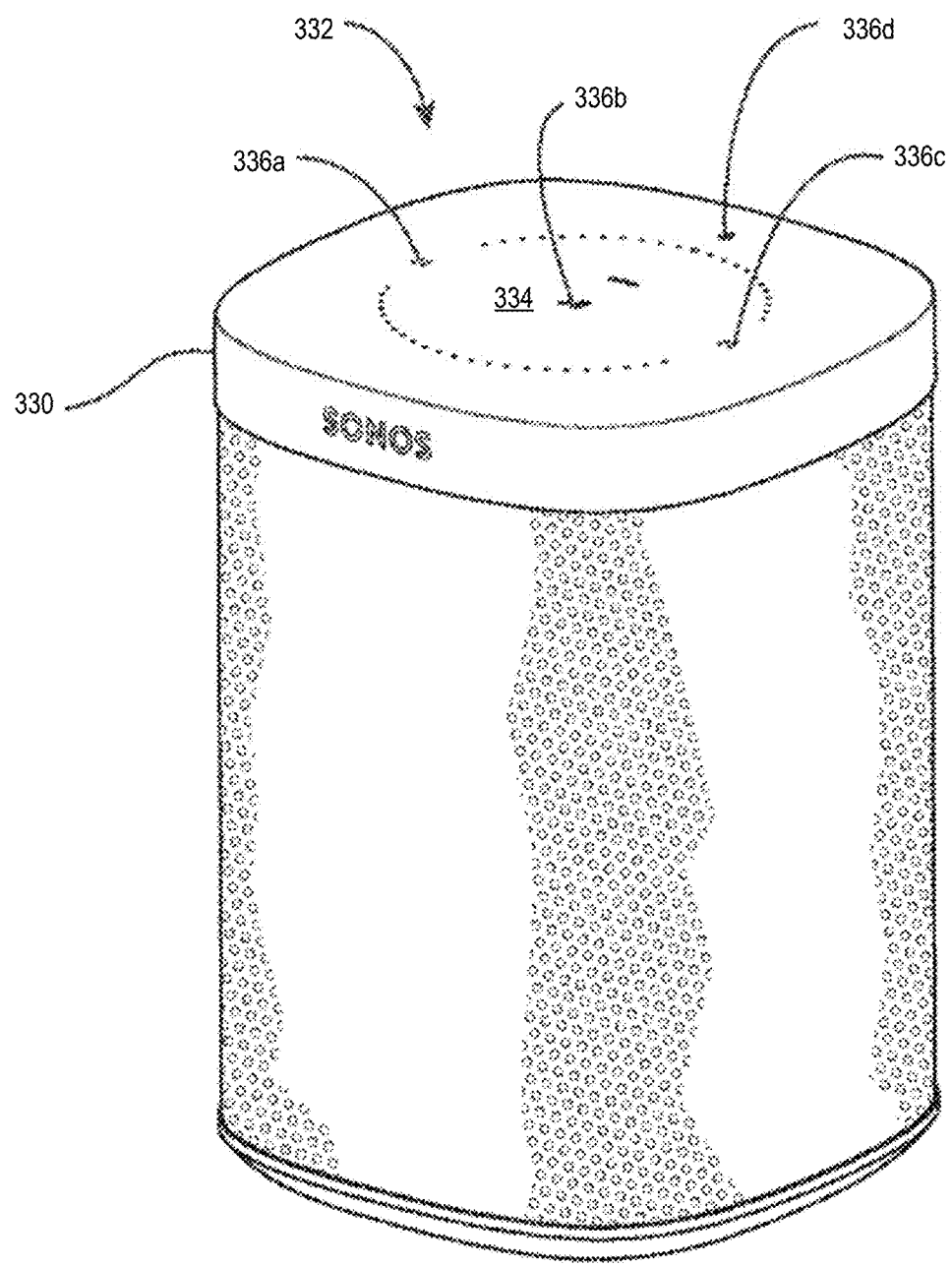
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336*a*, 336*b*, and 336*c* for controlling audio playback, volume level, and other functions. The control area 332 also includes a button 336*d* for toggling the microphones 115 to either an on state or an off state. The control area 332 is at least partially surrounded by apertures formed in the top portion 334 of the housing 330 through which the microphones 115 (not visible in FIG. 3) receive the sound in the environment of the playback device 110. The microphones 115 may be arranged in various positions along and/or within the top portion 334 or other areas of the housing 330 so as to detect sound from one or more directions relative to the playback device 110.

In some embodiments, the playback device 110 may take the form of a wired and/or wireless headphone (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404a to a second earcup 404b. Each of the earcups 404a and 404b may house any portion of the electronic components in the playback device 110, such as one or more speakers. Further, one or more of the earcups 404a and 404b may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406a and 406b that are coupled to ear cups 404a and 404b, respectively. The ear cushions 406a and 406b may provide a soft barrier between the head of a user and the earcups 404a and 404b, respectively, to improve user comfort and/or provide acoustic isolation from the ambient (e.g., passive noise reduction (PNR)).

III. Examples of Intelligent User Interfaces for Playback Devices

As discussed above, the examples herein relate to hardware user interfaces that provide intuitive and reliable control over a broad range playback device functionality. The playback device functionalities that may be controlled by such an interface may take various forms.

As one possibility, a hardware user interface of a playback device may provide a control for selecting content for playback and initiating playback directly from the playback device. For instance, the playback device may provide access to a set of shortcuts, or "quickstarts" for initiating content playback via the hardware user interface. Quickstarts may be defined by a user and may generally correspond to content that the user returns to frequently, and/or that the user defaults to when the user cannot decide what else to play. As some examples, one quickstart might include an internet radio station that the user enjoys. Another quickstart might include a playlist that was curated by the user or perhaps by a music content service. In this regard, the content represented by a given quickstart might not be constant, as a playlist might be updated by its creator or other collaborators over time. Yet another quickstart might include new episodes from one or more podcasts that the user has designated. In some cases, a quickstart might also include an indication of one or more playback devices (e.g., individual playback device(s), a Zone, an Area) in the media playback system that is configured to play back the predefined content when the quickstart is selected. Numerous other examples of user-defined quickstarts are also possible.

In addition to the types of user-defined quickstarts discussed above, the playback device may dynamically make other types of quickstarts available to the user based on contextual information. These types of quickstarts may include a "SmartPlay" designation, wherein the playback device (and/or another device in communication with the playback device) predicts, based on the context information, content that the user is likely to want to hear. As one example, if another playback device in the media playback system is currently playing back audio content, a SmartPlay quickstart to join the other playback device in synchronous playback of the already-playing content may be available.

As another example, a SmartPlay quickstart (also referred to herein as a "SmartPlay") might be based on the time of day, the day of the week, and/or the location of the playback device that will play the content. For instance, on a weekday morning, a SmartPlay for a playback device located in the Kitchen may include a shortcut to an internet radio news station, if the user tends to listen to news while getting ready for work in the morning. Alternatively, a SmartPlay for a playback device located on the outdoor patio may include a shortcut to a Reggae music playlist if the user tends to listen to Reggae music while outdoors. A SmartPlay for a playback device in a Bedroom, at night, may include a playlist including sleep sounds or white noise. A SmartPlay may be based on numerous other types of time-, day-, and location-based contextual information, as well as combinations thereof.

As another example, a SmartPlay might be based on the context of recently played media items. For instance, a SmartPlay may include a shortcut to resume long-form content that the user was recently listening to, such as an audiobook or a podcast. In this regard, the user may have been recently listening to the content on one or more other playback devices within the household or outside the household, such as a portable playback device or a vehicle-based playback device that is registered to the user. Alternatively, a SmartPlay may include an option to shuffle all recently played media items, or perhaps all recently saved media items (e.g., media items that were liked or added as a favorite) across playback devices to which the user has been listening. Numerous other examples of context-based SmartPlay quickstarts are also possible.

Figure 5:
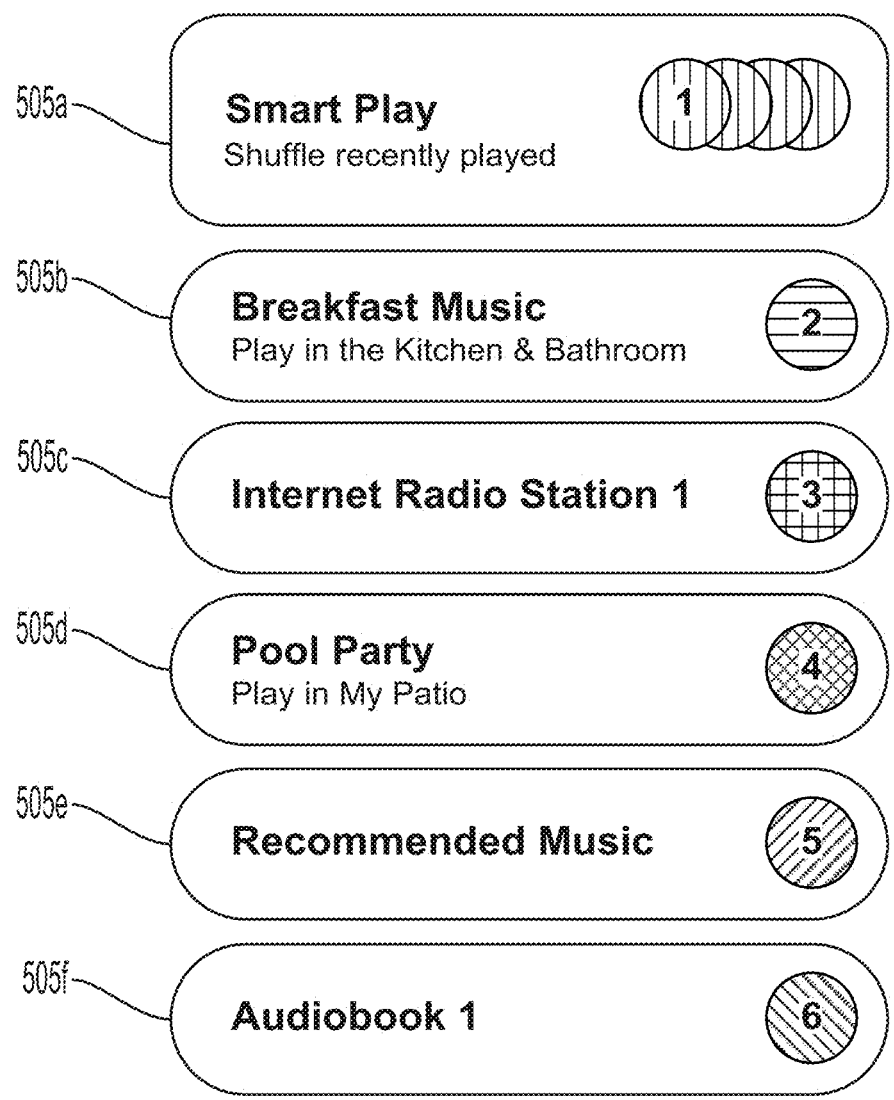
FIG. 5 is a is a schematic diagram of an example user interface on a control device showing a list of quick start options.

Turning to FIG. 5, an example list of quickstarts that a user might define for their media playback system is shown. Each quickstart represents a shortcut to either a SmartPlay option or user-designated media content. In FIG. 5, the first quickstart 505a is a SmartPlay that currently represents a shortcut to shuffle recently played music. As noted above, a SmartPlay quickstart may dynamically change based on contextual information. Thus, at a different time, the Smartplay quickstart 505a may represent a shortcut to resume playback of a podcast to which the user was recently listening. Further, the icon that is used to represent a given SmartPlay may also vary based on the nature of the underlying content. For example, the SmartPlay quickstart 505a is represented by an icon of stacked circles that may imply shuffled media content, whereas a SmartPlay that provides a shortcut to a recently listened-to audiobook may be represented by an icon of a book. Numerous other examples are also possible.

In some embodiments, a SmartPlay may be configured to provide context-based shortcuts based on a hierarchy of possible scenarios. The hierarchy may be a default hierarchy, or it may be user-defined. For example, a SmartPlay may be configured to prioritize displaying a shortcut to resume playback of any content (e.g., a podcast, an audiobook, an internet radio station, a playlist) that the user was listening to within a preceding window of time (e.g., 15 minutes, one hour, etc.). If this condition is not applicable, the SmartPlay may be configured to display a shortcut to join the nearest playback device in the media playback system that is currently playback back audio content. If this condition is also not applicable, the SmartPlay may be configured to shuffle recently played music, and so on.

Returning to FIG. 5, the second quickstart 505b is a shortcut to a playlist named "Breakfast Music" and further designates the playback devices (e.g., Kitchen and Bathroom) that will play back the Breakfast Music playlist in synchrony when the second quickstart 505b is selected. The third quickstart 505c is a shortcut to an internet radio station and like the SmartPlay quickstart 505a, it does not include a designation of which playback device(s) will play back the internet radio station when the third quickstart 505c is selected. The fourth quickstart 505d is a shortcut to a playlist named "Pool Party" that is designated to play on the My Patio playback device when the fourth quickstart 505d is selected.

The fifth quickstart 505e is a shortcut to another playlist named "Recommended Music" that may be curated based on the user's listening history, among other information. This type of user-focused playlist for the discovery of new music might be provided by the media playback system provider, or perhaps by another media content service. Lastly, the sixth quickstart 505f is a shortcut to an audiobook that has been designated by the user. Numerous other examples of quickstarts are also possible, and a given list may include more or fewer quickstarts than those discussed above.

The quickstarts discussed above may be initially defined by a user via a media playback system controller application running on a control device, such as the control device 130 discussed above. In this regard, the list of quickstarts shown in FIG. 5 may be displayed in a menu where a user can edit, delete, or add quickstarts.

As shown in FIG. 5, each of the quickstarts may be associated with a different number from one to six. In addition, each of the quickstarts may also be associated with a different color, which is represented in FIG. 5 by the differently shaded circles corresponding to each quickstart's associated number. For instance, the SmartPlay quickstart 505a, designated as number "1" may be associated with the color white, the second quickstart 505b, designated as number "2" may be associated with the color red, and so on. In this way, a user may be able to recognize each quickstart based on an indication of a color or a number. As shown in the following examples, this may facilitate various implementations for presenting and navigating between quickstarts on a hardware user interface of a playback device.

Figure 6:
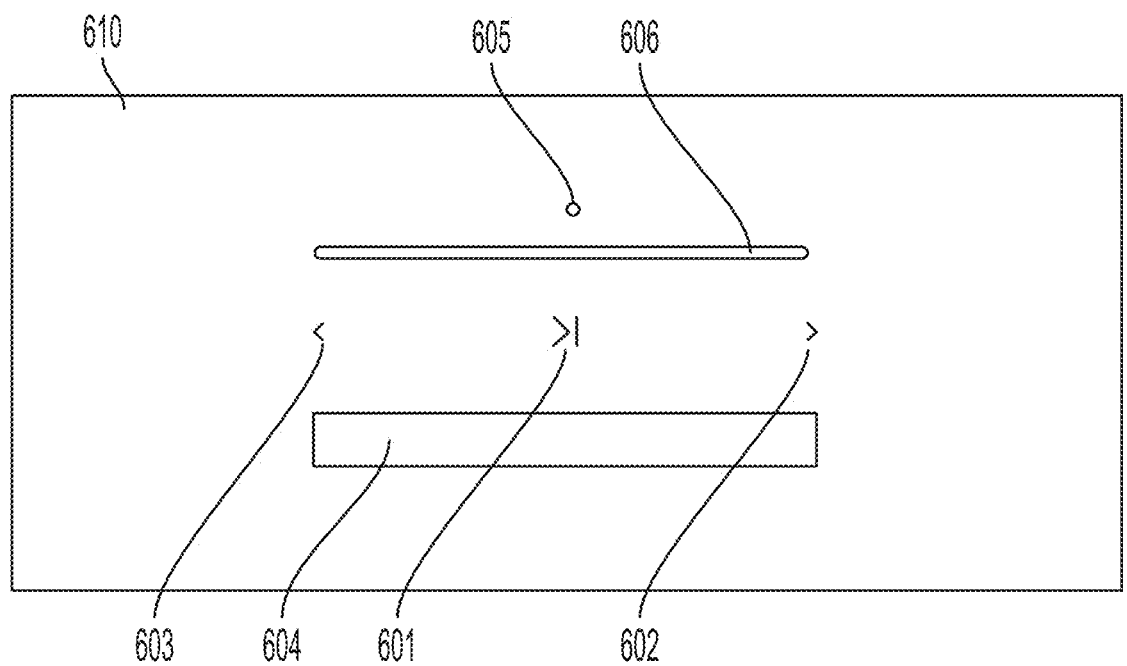
FIG. 6 is a schematic diagram of an example user interface on a playback device.

Turning to FIG. 6, an example hardware user interface of a playback device 610 is shown that includes various elements. The view in FIG. 6 may represent a top view of the playback device 610, although other locations for the interface elements are also possible. Included in the hardware user interface of the playback device 610 are a play/pause button 601, a skip forward button 602, and a skip backward button 603. In FIG. 6, these three transport control buttons take the form of capacitive touch controls, however physical buttons are also possible.

The hardware user interface of the playback device 610 also includes a volume control bar 604, which may take the form of a groove or depression that includes a capacitive touch surface therein. To adjust the volume, a user may slide their finger within the groove either left (to lower the volume) or right (to raise the volume). In this regard, the location of the user's finger within the groove might not correspond to any particular volume level of the playback device 610. Rather, the volume control bar 604 may provide the same relative volume control, up or down, for a given movement of the user's finger regardless of where the user's finger was located within the groove. In some embodiments, discussed in greater detail below, the magnitude at which the volume changes when a user slides their finger may scale according to the speed at which the user moves their finger within the groove. In this way, the volume control bar 604 may provide for relatively smooth volume adjustments that feel similar to turning a dial, rather than repeatedly tapping a volume up or volume down button. At the same time, the layout of the volume control bar 604 within a groove provides tactile feedback that may allow users to confidently find the volume control bar 604 and adjust the volume by only glancing at the playback device 610 briefly, or perhaps not looking at it at all.

Moreover, the arrangement of the tactile volume control bar 604 with respect to the transport control buttons 601, 602, and 603 may allow a user's finger to locate those buttons with relatively low attention from the user. Consider an unsighted user who might touch the top of the playback device 610 and locate the edge of the volume control bar 604 with their finger. Without moving their finger into the groove to adjust the volume, the unsighted user may be able to easily perceive the extents of the volume control bar 604 (e.g., its left end, its center, its right end). From this orienting information, the unsighted user may locate any of the play/pause button 601, the skip forward button 602, of the skip backward button 603 with a high degree of confidence.

The hardware user interface shown in FIG. 6 also includes a quickstart control bar 606, which may take the form of a groove or depression that includes a capacitive touch surface therein, similar to the volume control bar 604. In some examples, as shown in FIG. 6, the quickstart control bar 606 may be shaped differently than the volume control bar 604 to provide a different tactile experience (e.g., thinner, less deep, convex rather than concave, etc.).

To select a quickstart via the hardware user interface of the playback device 610, the user may slide their finger either left or right across the quickstart control bar 606. To facilitate this selection, the quickstart control bar 606 may be paired with a visual indicator, such as an LED 605, which may change colors to reflect a given quickstart according to the color associations discussed above. For example, a user may approach the playback device 610 while it is not playing back audio content, and the LED 605 may be unilluminated. The user may swipe to the right across the quickstart control bar 606, which may cause the LED 605 to become illuminated white, corresponding to the first quickstart 505a. The user may swipe to the right one or more additional times to proceed through the list of quickstarts in numerical order, moving next to the second quickstart 505b that is indicated by the LED 605 changing to red, then the third quickstart 505c that is indicated by the LED 605 changing to yellow, and so on. If the user swipes on the quickstart control bar 606 to the left, they may proceed through the list of quickstarts in the opposite direction. When the user reaches the quickstart they want, the user can select the play/pause button 601 to begin playback. Alternatively, playback of the selected quickstart may begin automatically once the user stops swiping on the quickstart control bar 606 for a given period of time (e.g., 3 seconds).

In some embodiments, the playback device 610 might also provide audible feedback to indicate which quickstart has been selected via the quickstart control bar 606. For instance, the playback device 610 may output an indication of each quickstart's associated number via text-to-speech. Thus, when the user initially swipes across the quickstart control bar 606 to select the first quickstart 505a and the LED 605 changes to white, the playback device 610 may audibly output the word "One." Similarly, when the user swipes to the second quickstart 505*b* and the LED 605 changes to red, the playback device 610 may audibly output the word "Two," and so on. Alternatively, the text-to-speech output for each quickstart might read back the name of the quickstart such as "Shuffle recents via SmartPlay" or "Breakfast Music." Other examples, including combinations of the above, are also possible.

After playback of audio content is initiated at the playback device 610 via one of the quickstarts, the LED 605 may remain illuminated to indicate which quickstart was used. This may allow a user to see what audio content (e.g., what playlist) is currently being played. On the other hand, it will also be appreciated that some quickstarts that may be selected at the playback device 610 might nonetheless not result in the playback device 610 playing back the audio content. For example, the second quickstart 505*b* discussed above includes a designation of the playback devices (e.g., Kitchen and Bathroom) that will play back the Breakfast Music playlist when the second quickstart 505*b* is selected, yet the user might select the second quickstart 505*b* from a playback device 610 that is in the Bedroom. In these situations, the Kitchen and Bathroom playback devices may begin playing back the Breakfast Music playlist while the playback device 610 does not. Further, the LED 605 may return to an unilluminated state once the selection of the second quickstart 505*b* at playback device 610 is complete. At the same time, a respective LED on each of the Kitchen and Bathroom playback devices might become illuminated red, indicating the second quickstart 505*b* and the Breakfast Music playlist, even though the quickstart was not selected from any of those playback devices.

Although the examples above generally describe selecting a quickstart when the playback device 610 is not playing back any content, a quickstart may also be selected using the quickstart control bar 606 to change what is currently playing on the playback device 610.

Figure 7:
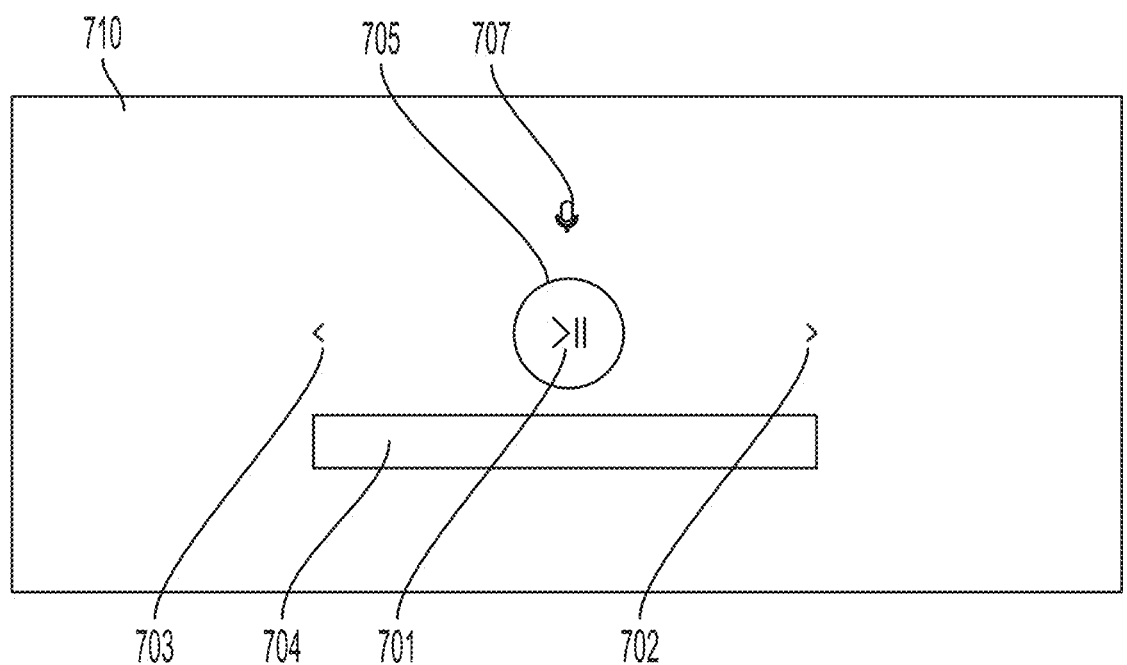
FIG. 7 is a schematic diagram of another example user interface on a playback device.

FIG. 7 shows another example hardware user interface of a playback device 710 that includes some similar elements to the playback device 610. For instance, the hardware user interface of the playback device 710 includes a play/pause button 701, a skip forward button 702, a skip backward button 703, and a volume control bar 704, as discussed above with respect to FIG. 6. Rather than the solitary LED 605, however, the playback device 710 includes a visual indicator in the form of an LED ring 705.

The LED ring 705 may provide various useful indications. For example, when a user engages the volume control bar 704, the LED ring 705 may transition to display a circle that is only partially illuminated, starting from a particular point (e.g., the top, 12 o'clock position) and moving clockwise, in proportion to the absolute volume level of the playback device 710 (e.g., 25% volume, 50% volume, etc.). This may provide useful information that would otherwise be hidden from the user, since swiping left or right on the volume control bar 704 may only facilitate relative volume changes. For instance, as the user swipes to the right on the volume control bar 704 and the volume is increased, the LED ring 705 may display a partially illuminated circle that grows in the clockwise direction. If the user wishes to stop at 50% volume, they can watch the indication of this absolute volume level increase on the LED ring 705 and stop swiping across the volume control bar 704 when the circle is illuminated half-way around the ring from the starting point (e.g., to the bottom) of the LED ring 705.

As another example, the LED ring 705 may also provide a visual indication by changing colors according to the currently selected quickstart, similar to the LED 605. However, a quickstart control bar is not present on playback device 710. Instead, a user may activate a quickstart selection mode by long-pressing on either the skip forward button 702, the skip backward button 703, or the play/pause button 701. Once the quickstart selection mode is activated, the LED ring 705 may become illuminated, and the user may scroll between quickstarts by pressing the skip forward or skip backward buttons. As discussed above with respect to FIG. 6, the LED ring 705 may change colors with each selection, and the playback device 710 may provide text-to-speech feedback as well.

In an alternative embodiment, the user may scroll between quickstarts by continuing to hold either the skip forward or skip backward button after activating the quickstart selection mode. While holding down one of these buttons, the playback device 710 may cycle through the list of quickstarts at a given interval (e.g., every 2 seconds), with corresponding updates to the color of the LED ring 705 and audible outputs, as appropriate.

The hardware user interface of the playback device 710 also includes a microphone indicator 707, which may indicate the operational status of the microphone(s) for playback device 710. For example, the microphone indicator 707 may include an LED (e.g., similar to the LED 605) that remains unilluminated when the microphone(s) are turned off, as shown in FIG. 7, and which becomes illuminated when the microphones are turned on. The microphone indicator 707 may also serve as a capacitive touch control for toggling the microphones on and off. Alternatively, the microphone(s) may be turned on and off via a physical switch (e.g., on the back of the playback device 710), with the microphone indicator providing only an indication of the corresponding status.

Figure 8:
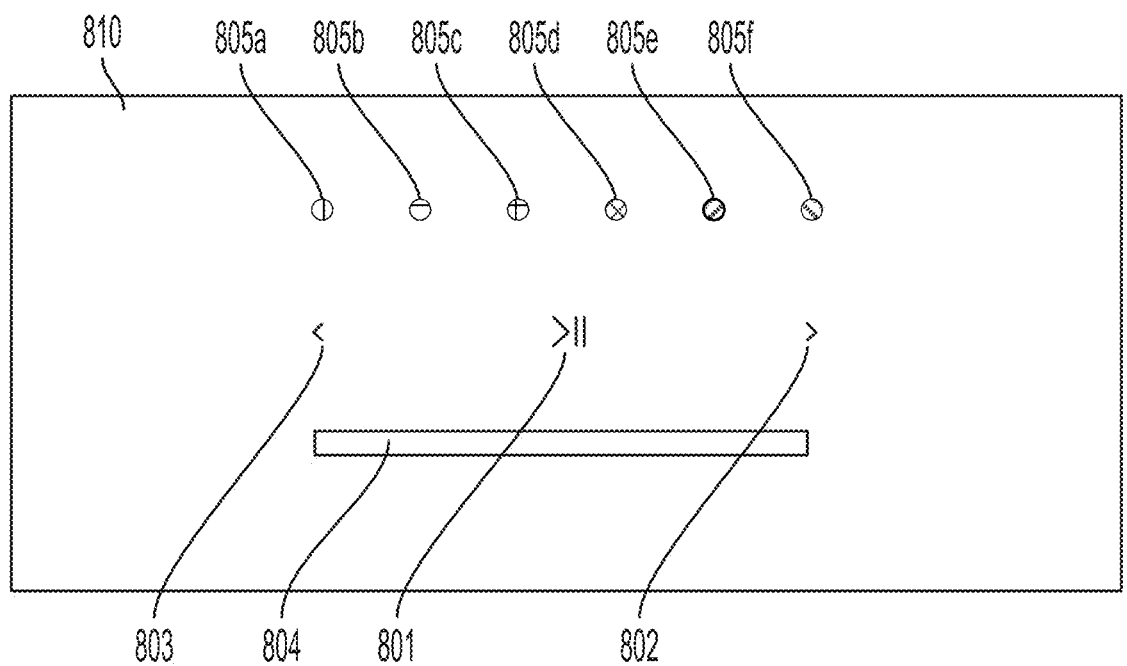
FIG. 8 is a schematic diagram of another example user interface on a playback device.

FIG. 8 shows another example hardware user interface of a playback device 810 that includes some similar elements to those discussed above. For instance, the hardware user interface of the playback device 810 includes a play/pause button 801, a skip forward button 802, a skip backward button 803, and a volume control bar 804, as discussed above with respect to FIGS. 6 and 7. Further, the playback device 810 includes a set of LEDs that are colored corresponding to each respective quickstart from the list shown in FIG. 5. For instance, the first LED 805*a* may be white and correspond to the first quickstart 505*a*. The second LED 805*b* may be red and correspond to the second quickstart 505*b*, and so on for the remaining LEDs 805*c*, 805*d*, 805*e*, and 805*f*.

Further, each LED shown in FIG. 8 may also be positioned within or adjacent to (e.g., directly below) capacitive touch controls of the playback device 810 such that each LED functions as both a visual indicator and a button that may be pressed to select its corresponding quickstart. Each of the LEDs may remain illuminated, but in a relatively dim state, when its corresponding quickstart is not active, and may transition to a brighter level of illumination when selected by the user. In this way, the list of available quickstarts, as represented by the colored LEDs, may always be visible. Thus, text-to-speech feedback indicating the user's current position when navigating the list (e.g., "One," "Two," etc.) might be redundant. On the other hand, the playback device 810 may still provide a text-to-speech output of a quickstart's name when it is selected.

Figure 9:
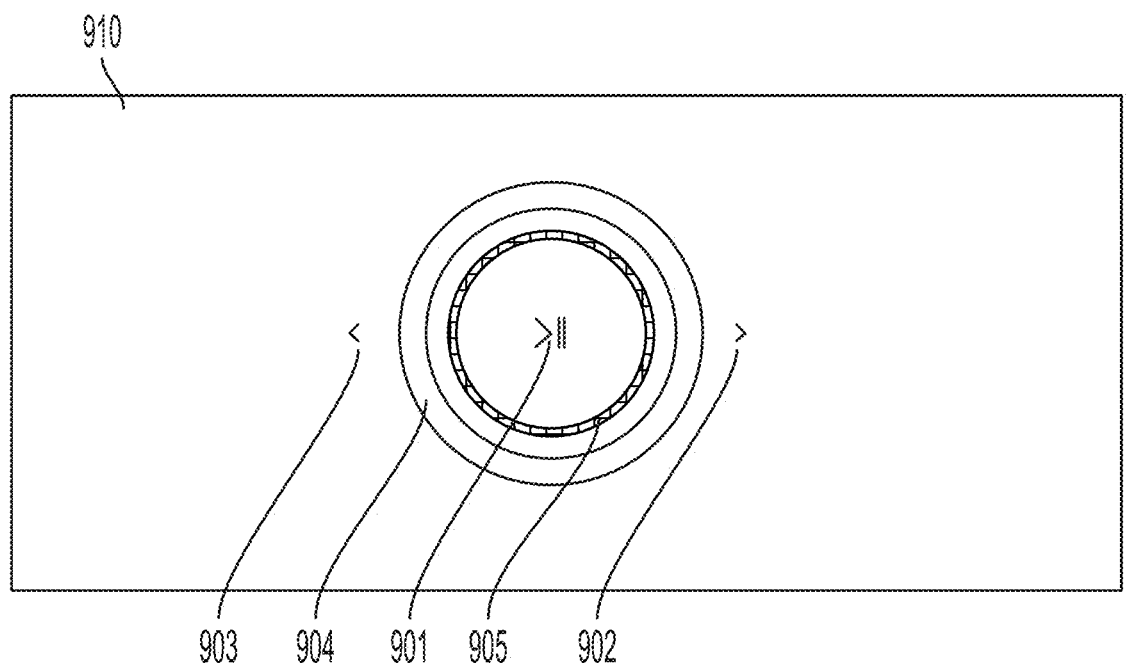
FIG. 9 is a schematic diagram of another example user interface on a playback device.

Turning to FIG. 9, another example hardware user interface is shown on a playback device 910, which includes some similar elements to those discussed above. For instance, the hardware user interface of the playback device 910 includes a play/pause button 901, a skip forward button 902, a skip backward button 903. Instead of a volume control bar, however, the playback device 910 includes a volume control ring 904 that may take the form of a circular groove or depression that includes a capacitive touch surface therein, and which surrounds the play/pause button 901. Thus, rather than providing for relative volume control via right and left swipes, the volume control ring 904 may be utilized by moving a finger within the groove in a clockwise direction to raise the volume, and a counter-clockwise direction to lower the volume. Similar to the volume control bar 604 discussed above, the location of the user's finger within the groove might not correspond to any particular volume level of the playback device 910. Rather, the volume control ring 904 may provide the same relative volume control, up or down, for a given movement of the user's finger regardless of where the user's finger was located within the groove. Further, as can be seen in FIG. 9, the volume control ring 904 may provide a tactile reference point in a similar way to the volume control bars discussed above, such that a user can easily locate the transport control buttons.

Figure 9A:
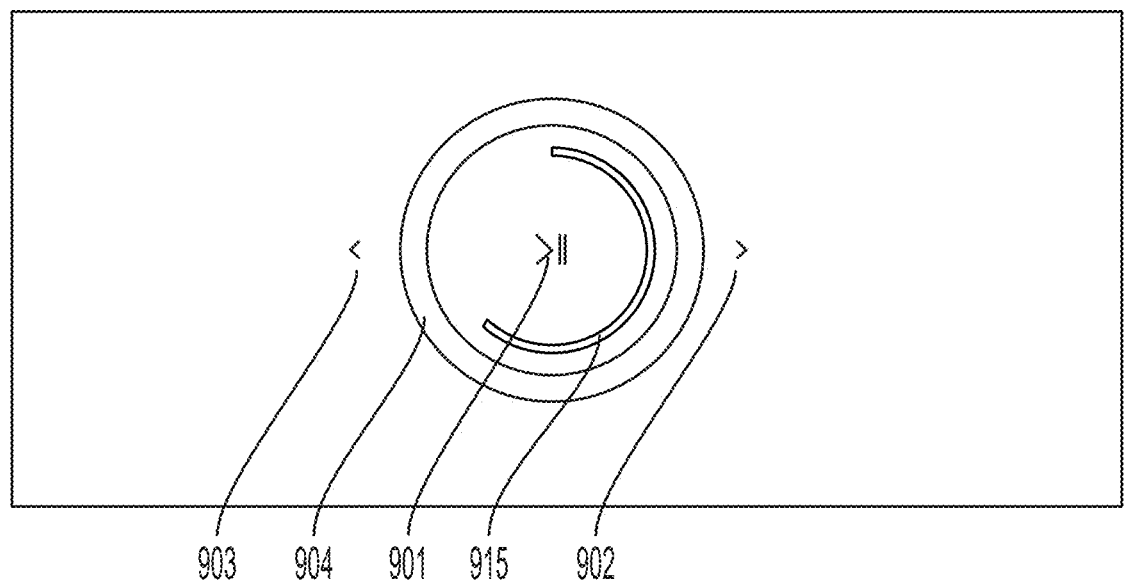
FIG. 9A shows another schematic diagram of the example user interface of FIG. 9 during a volume control command.

Also surrounding the play/pause button 901, and within the volume control ring 904, is an LED ring 905, which may be similar to the LED 705 discussed above with respect to FIG. 7. For instance, the LED ring 905 may change colors to indicate a quickstart that has been selected. Additionally, the LED ring 905 may dynamically indicate the absolute volume level of the playback device 910, as discussed above. FIG. 9A shows an example view of the playback device 910 after a user has begun to adjust the volume by manipulating the volume control ring 904. Accordingly, the LED ring 905 has been updated to display a partially illuminated circle 915 that provides an indication of the absolute volume level (e.g., 60% volume). After the user has finished making the volume adjustment, the partially illuminated circle 915 may revert to the LED ring 905 shown in FIG. 9.

Figure 9B:
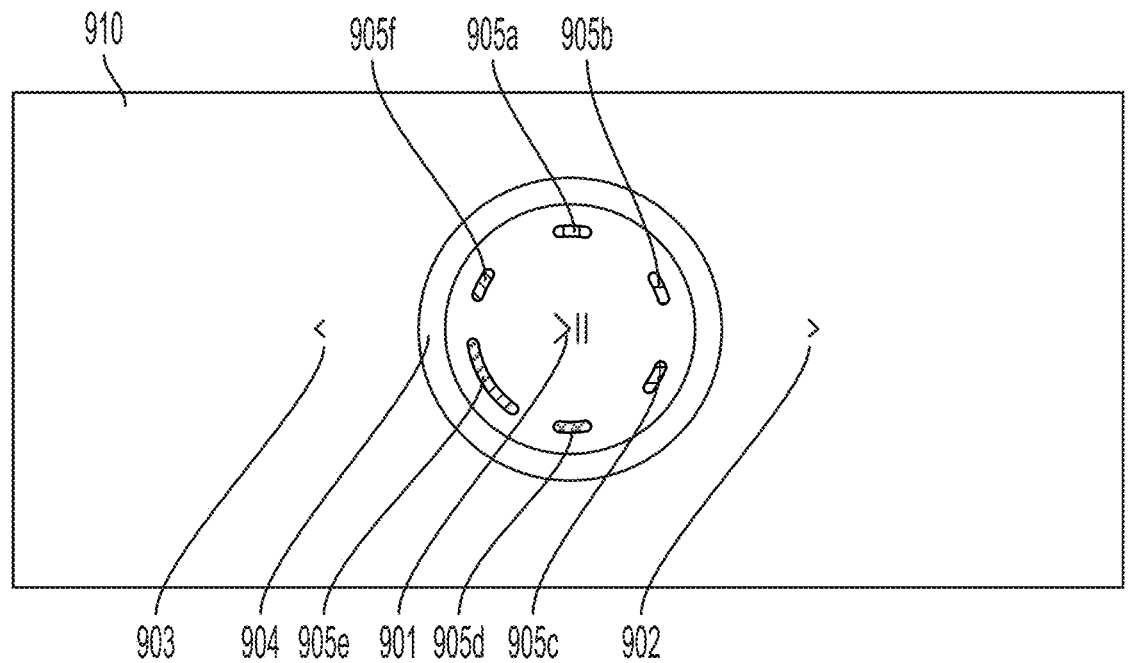
FIG. 9B shows another schematic diagram of the example user interface of FIG. 9 during quickstart selection.

FIG. 9B shows yet another example view of the playback device 910 after the user has activated a quickstart selection mode. Similar to playback device 710 discussed above with reference to FIG. 7, the user may activate the quickstart selection mode by long-pressing on either the skip forward button 902, the skip backward button 903, or the play/pause button 901. However, rather than cycling through different quickstart-associated colors as discussed above, the LED ring 905 may break apart into a set of illuminated segments as shown in FIG. 9B. Each segment may correspond to a particular quickstart and may be colored accordingly. For example, the first segment 905a may be colored white and correspond to the first quickstart 505a, the second segment 905b may be colored red and correspond to the second quickstart 505b, and so on for segments, 905c, 905d, 905e, and 905f.

Once the playback device 910 entered the quickstart selection mode, the user may navigate between quickstarts by pressing the skip forward or skip backward buttons, scrolling their finger around the volume control ring 904, or by maintaining the long press that was used to activate the quickstart mode, as discussed above. Further, the user might tap a particular location in the volume control ring 904 that aligns with the segment, and corresponding quickstart, they wish to select. While navigating in any of these ways, the currently selected quickstart may be indicated by a relatively larger segment, as shown by segment 905e in FIG. 9B. If the user navigates to the next quickstart, the segment 905f may become enlarged as the segment 905e returns to the same size as the other segments. As in the examples above, the playback device 910 may also provide text-to-speech playback of the name of each quickstart as the user navigates between them.

In some implementations, the playback device 910 may include one or more sensors that may be used for motion detection (e.g., one or more microphones) to determine when a user has approached the playback device 910. In these situations, the playback device 910 may be configured to automatically transition into the quickstart selection mode if it is not playing back content, in anticipation that the user is approaching the playback device 910 to initiate playback of content. In some further examples, each of the segments shown in FIG. 9B might be directly selectable via a capacitive touch interface of the playback device 910, similar to the LEDs shown in FIG. 8 and discussed above, such that the user does not need to navigate between them to make a selection.

Figure 10:
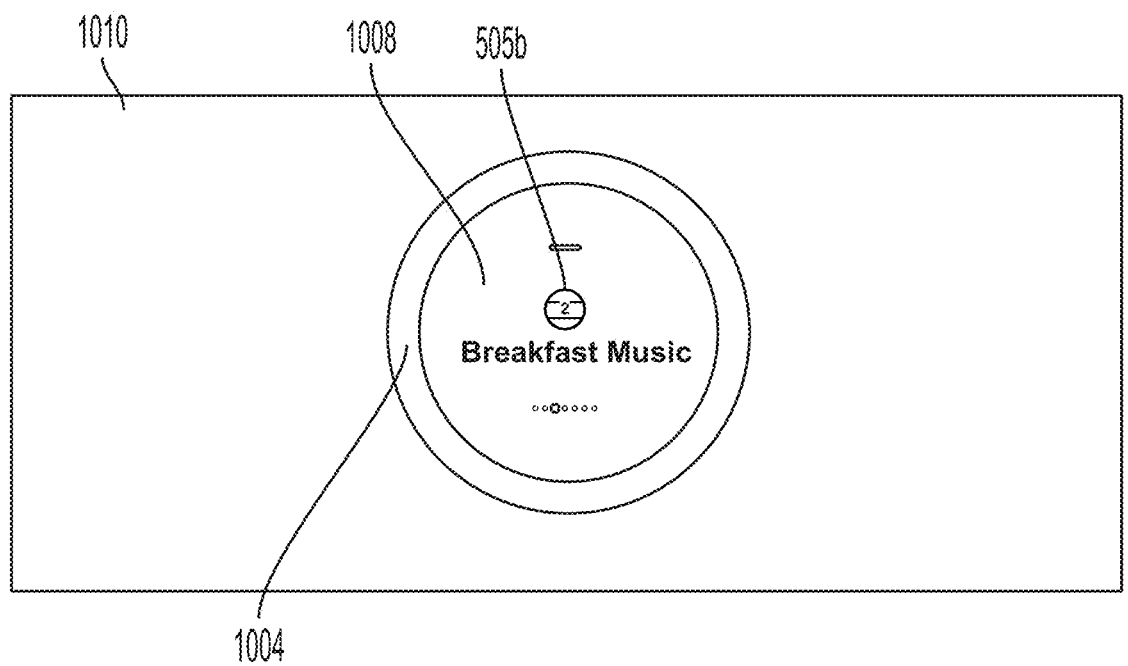
FIG. 10 is a schematic diagram of another example user interface on a playback device.

FIG. 10 shows another example hardware user interface on a playback device 1010. The hardware user interface of the playback device 1010 includes a volume control ring 1004, which may be similar to the volume control ring 904 shown in FIGS. 9-9B and discussed above. Within the volume control ring 1004, the playback device 1010 includes a graphical display 1008 (e.g., a touchscreen) that can be used to present various information and control capabilities. For instance, in the example shown in FIG. 10, the graphical display 1008 is presenting an indication of the second quickstart 505b, including its associated number "2" and its name, "Breakfast Music." Further, the text of the indication may be red, the color that is associated with the second quickstart 505b. A user may tap the indication of the second quickstart 505b to initiate the "Breakfast Music" playlist, or may swipe left or right on the graphical display 1008 to navigate to a different quickstart. Alternatively, the user might swipe up or down to access other controls.

Figure 10A:
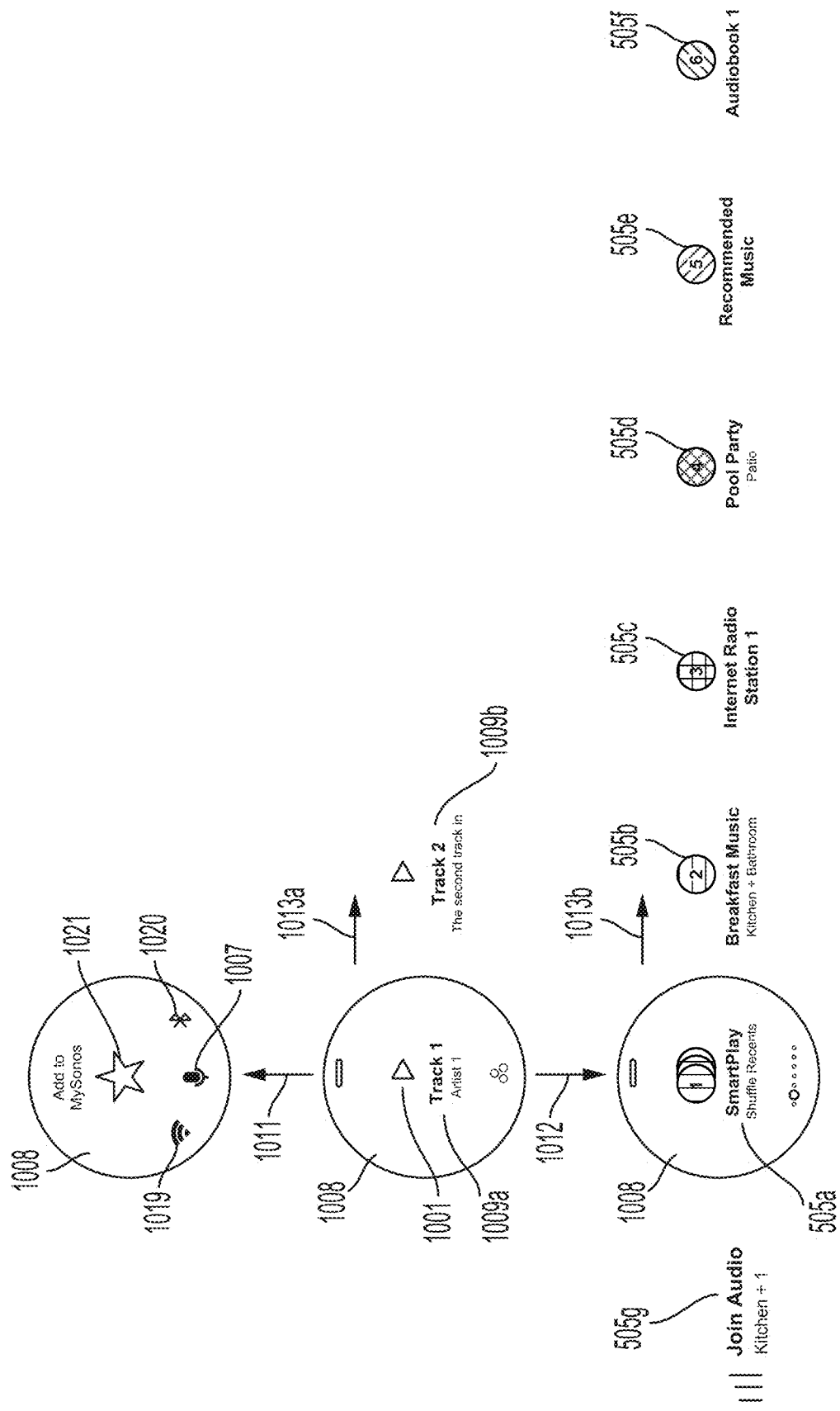
FIG. 10A shows example navigations between various screens presented on a graphical display of the example user interface of FIG. 10.

In this regard, FIG. 10A depicts a schematic diagram of example navigations between different screens on the graphical display 1008. For example, when the playback device 1010 is playing back media content, the graphical display 1008 may present a now-playing screen that includes an indication 1009a of the currently-playing media item. The indication 1009a may include a track name and/or an artist name, among other information (e.g., album art, etc.), as well as a play/pause indicator 1001. Thus, touching the indication 1001 may pause (or resume) playback of the current media item. Further, the user may swipe across the graphical display 1008 from right to left (or vice versa) to skip forward, as represented by the arrow 1013a. Doing so may skip to the next media item and cause the indication 1009a to be replaced by the indication 1009b. Conversely, swiping across the graphical display 1008 from left to right (or vice versa) may skip backward. In this way, the hardware user interface of the playback device 1010 may provide transport controls via the graphical display 1008, without the need for dedicated capacitive touch buttons as shown in the previous examples.

From the now-playing screen, a user may swipe across the graphical display 1008 from bottom to top (or vice versa), as represented by the arrow 1012, to access the quickstarts menu. As noted above with reference to FIG. 10, the graphical display 1008 may present an indication of each quickstart that includes the quickstart's name, associated number, and associated color. The user may swipe horizontally to navigate between the quickstarts, shown by way of example by the arrow 1013b. Further, because the indication of each quickstart indicates its name, number, and color on the graphical display 1008, there may be no need for the playback device 1010 to provide a text-to-speech output as the user navigates between quickstarts. Nevertheless, a text-to-speech output may be turned on (e.g., via settings on the playback device or a controller) as an option.

In addition, FIG. 10A depicts an example in which the playback device 1010 has added an additional SmartPlay quickstart to the list of six quickstarts that have generally been discussed in the examples above. Namely, the Smart-Play 505g shown in FIG. 10A represents a "Join Audio" shortcut that, when selected, acts as a grouping command that causes the playback device 1010 to join in the playback of media content that is already being played by another playback device in the media playback system. This Smart-Play quickstart 505g to "Join Audio" may be present when applicable, and may not be present when there are no other playback devices playing back media content. This, in turn, may allow for the first SmartPlay quickstart 505a to omit the "Join Audio" shortcut from its list of potential SmartPlay options, and instead remain focused on other types of SmartPlay content predictions. In one example, upon initiation of the graphical display 1008, if content is playing or queued for playback by the playback device 1010, the graphical display 1008 may present the now-playing screen showing the content that is playing or queued. In another example, if no content is playing or queued for playback, the graphical display 1008 may automatically present the quickstarts menu. The quickstarts menu may begin with Smart-Play quickstart 505g if one or more other playback devices in the media playback system is currently playing content, and SmartPlay quickstart 505a if no other playback devices in the media playback system is currently playing content. Alternatively, the quickstarts menu may start with the Smart-Play quickstart 505a regardless of whether content is currently being played by another playback device in the media playback system.

Referring again to the now-playing screen of the graphical display 1008, a user may swipe across the graphical display 1008 from top to bottom, as represented by the arrow 1011, to access a device status screen that includes additional capabilities of the playback device 1010. As one possibility, the device status screen might include a star icon 1021 (or the like) that may be used to tag or otherwise save the currently playing media item as a favorite. Further, the device status screen may include microphone indicator 1007, which may be used to view microphone status and/or toggle the microphones on and off, as discussed above. As another possibility, the device status screen might include a WiFi indicator 1019, which may provide a graphical indication of the playback device's current WiFi status (e.g., on/off, connected/not connected) as well as signal strength when connected. Further, the WiFi indicator 1019 may be selectable to access a list of available wireless networks that are within range of the playback device 1019, which may be highly beneficial for easily switching between networks (e.g., by scrolling through the list and selecting a desired network) or for troubleshooting connection issues.

Similarly, the device status screen may include a Bluetooth indicator 1020, which may provide a graphical indication of the playback device's current Bluetooth status (e.g., on/off, connected/not connected). Further, the Bluetooth indicator 1020 may be selectable to access a list of available devices to which the playback device 1010 has previously connected, or to initiate a new connection. Similar to the WiFi controls, a selectable list of available device connections may be highly beneficial for easily switching between Bluetooth content sources (e.g., a nearby smartphone, a nearby television, etc.).

Figure 10B:
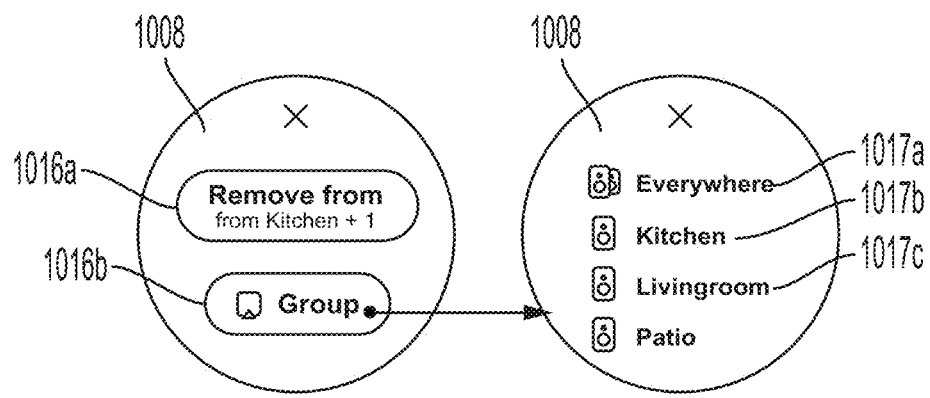
FIG. 10B shows an example navigation between two screens presented on the graphical display of the example user interface of FIG. 10.

Still further, from the now-playing screen shown in FIG. 10A, a user may long-press on the graphical display 1008 to access a grouping menu, as shown in FIG. 10B. The grouping menu may include an ungrouping icon 1016a if the playback device 1010 is currently grouped with any other playback devices, the selection of which may cause the playback device 1010 to be removed from the group. Further, the grouping menu may include a grouping icon 1016b that, when selected, causes the graphical display 1008 to present a list of playback devices with which the playback device 1010 may be grouped. In this regard, the list may include device groups, zones, areas, or any other grouping of playback devices that exist by default or that the user has previously saved. For example, the list shown in FIG. 10B includes an indication 1017a named "Everywhere" that, if selected, may cause all playback devices in the media playback system to become grouped for synchronous playback. Further, the list includes an indication 1017b of a Kitchen playback device, an indication 1017c of a Living Room playback device, and so on. The list may also be vertically scrollable to view additional playback devices that are not displayed due to space. In some cases, selection of the grouping icon 1016b may cause the graphical display 1008 to present a list of all playback devices in the media playback system with corresponding icons (e.g., solid or hollow circles or squares) indicating whether a playback device in the list is currently grouped with the playback device 1010. From there, each playback device displayed in the list may be pressed to toggle between being grouped or not grouped with the playback device 1010. Other examples are also possible.

Similar to some of the examples discussed above, and as shown in FIG. 10C, manipulation of the volume control ring 1004 on the playback device 1010 may cause the graphical display 1008 to present a volume control screen that includes partial circle 1015a that is proportional in size to the absolute volume of the playback device 1010. If the playback device 1010 is grouped with any other playback devices, the volume control screen may additionally present a local volume icon 1014a and a group volume icon 1014b. These icons may allow the user to toggle between which device(s) the volume control ring 1004 is currently controlling. When the group volume icon 1014b is selected, the partial circle 1015a representing the absolute volume of the playback device 1010 may be replaced by a different partial circle 1015b that represents the composite volume of the grouped playback devices.

FIG. 11 shows another example hardware user interface on a playback device 1110 that includes a graphical display 1108. Due to its relatively larger size, the graphical display 1108 may present more information than the graphical display 1008 shown in FIGS. 10-10C and discussed above. For example, as shown in FIG. 11, the graphical display 1108 may present a now-playing screen that includes an indication 1109 of the currently-playing media item along with a play/pause indicator 1101. Touching the play/pause indicator 1101 may pause (or resume) playback of media content at the playback device 1110. To skip forward or backward, a user may swipe horizontally across the graphical display 1108, similar to the transport controls on the graphical display 1008 shown in FIGS. 10-10C. Further, the now-playing screen includes a volume up indicator 1122a and a volume down indicator 1122b. In this regard, the volume controls on the playback device 1110 may incorporated into the graphical display 1108, rather than a volume control bar or ring, as in the examples above.

The now-playing screen shown in FIG. 11 also includes a star icon 1121 that may be used to tag or otherwise save the currently playing media item as a favorite. A grouping indicator 1116 is also displayed that may provide information regarding the grouping status of the playback device 1110. For example, the grouping indicator 1116 indicates that the playback device 1110 is part of a playback group called "Living Room+1."

Figure 10C:
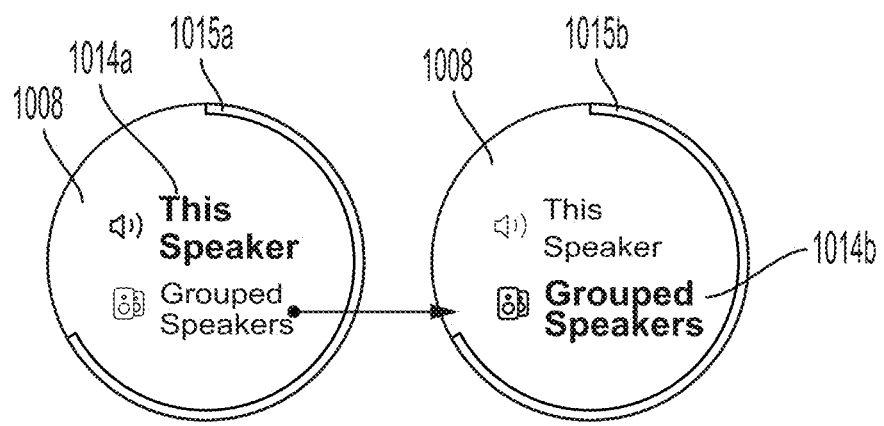
FIG. 10C shows another example navigation between two screens presented on the graphical display of the example user interface of FIG. 10.

Similar to the graphical display 1008 shown in FIGS. 10-10C, a user may swipe vertically across the graphical display 1108 access other screens with additional functionality, such as a quickstarts menu that resembles the quickstarts menu shown in FIG. 10A. Likewise, a device status screen may present a WiFi indicator, Bluetooth indicator, as well as other indicators that may be selected to access other device capabilities (e.g., microphone settings, equalization settings, etc.).

Figure 11A:
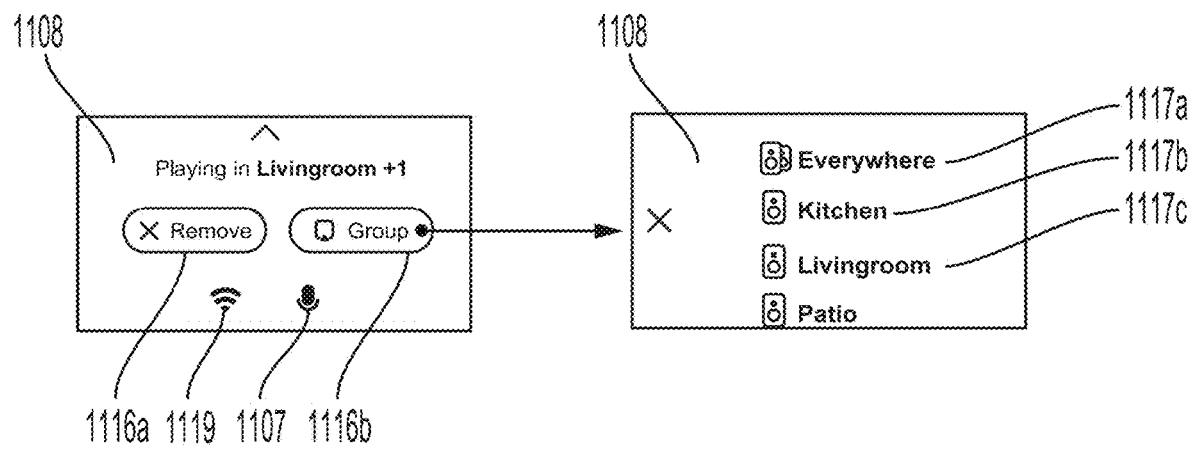
FIG. 11A shows an example navigation between two screens presented on a graphical display of the example user interface of FIG. 11.

The graphical display 1108 of playback device 1110 may also present a grouping menu, as shown in FIG. 11A. The grouping menu may be accessed by selecting the grouping indicator 1116 from the now playing screen, or perhaps by long-pressing on the now playing screen. Like the previous example, the grouping menu may include an ungrouping icon 1116a to remove the playback device 1110 from a group in which it is currently a member. Further, the grouping menu may include a grouping icon 1116b that, when selected, causes the graphical display 1108 to present a list of playback devices with which the playback device 1110 may be grouped. The list of playback devices may include indications 1117a, 1117b, and 1117c, similar to those shown in FIG. 10B, and the user may scroll vertically to access additional playback devices that may not be displayed due to space, as well as to toggle playback devices into and out of the group with the playback device 1110, as in prior examples.

In some implementations, various capabilities of the playback device 1110 may be accessed from the grouping menu. For example, the grouping menu shown in FIG. 11A includes a WiFi indicator 1119 and a microphone indicator 1107, each of which may convey respective statuses. Further, these indicators may be selectable to access additional screens for controlling the associated functionality of the playback device 1110, as discussed above.

Figure 11B:
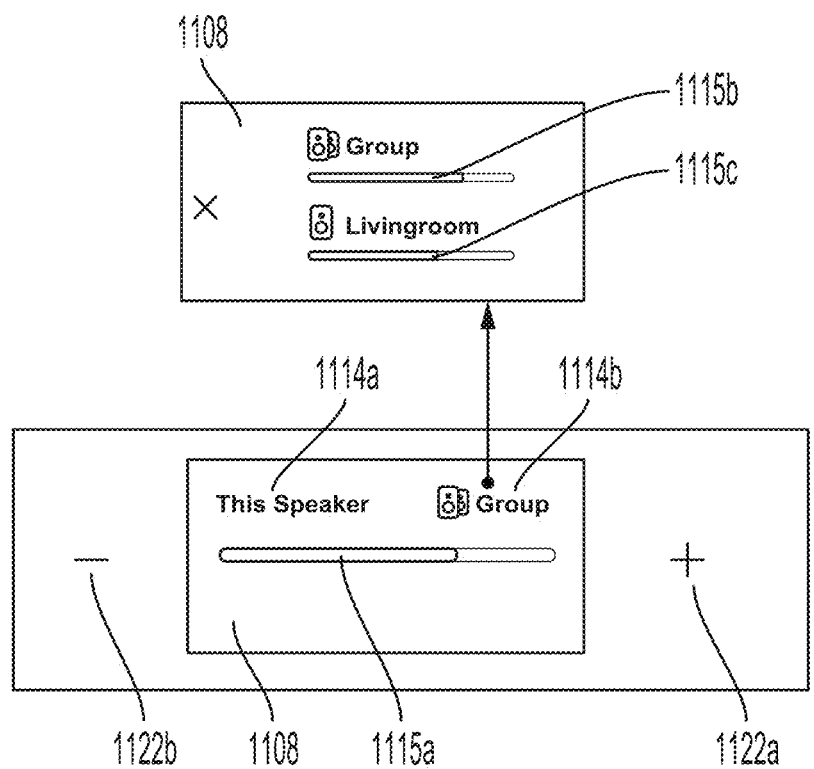
FIG. 11B shows another example navigation between two screens presented on the graphical display of the example user interface of FIG. 11.

The graphical display 1108 of playback device 1110 may also present a volume control screen, as shown in FIG. 11B, when the user selects either of the volume up indicator 1122a or the volume down indicator 1122b. Like the examples above, the volume control screen may include a linear volume indication 1115a that represents the absolute volume of the playback device 1110. Unlike some of the examples above, however, the linear volume indication 1115a may be directly selectable by the user to quickly control the volume of the playback device 1110 on an absolute scale. For instance, if the user wishes to increase the volume from a relatively low level to 75%, the user may select the volume up indicator 1122a to trigger the display of the volume control screen, then touch and drag the linear volume indication 1115a directly to the 75% mark, rather than continuing to tap the volume up indicator 1122a until the desired volume level is reached.

The volume control screen shown in FIG. 11B includes a local volume icon 1114a and a group volume icon 1114b, which the user may use to navigate between controlling the individual volume of the playback device 1110 and the group volume for a group that includes the playback device 1110 as a member. However, the options presented for group volume control via the graphical display 1108 may be more robust than those shown in the example of FIG. 10C. For example, selecting the group volume icon 1114b may cause the graphical display 1108 to present not only a linear volume indication 1115b for the composite group volume, but also an individual linear volume indication for each individual playback device in the group, such as the linear volume indication 1115c for the Living Room playback device, and so on. Like the linear volume indication 1115a, each of the group volume indications shown in FIG. 11B may be directly manipulated by the user to make absolute volume adjustments among the group members.

Figure 12:
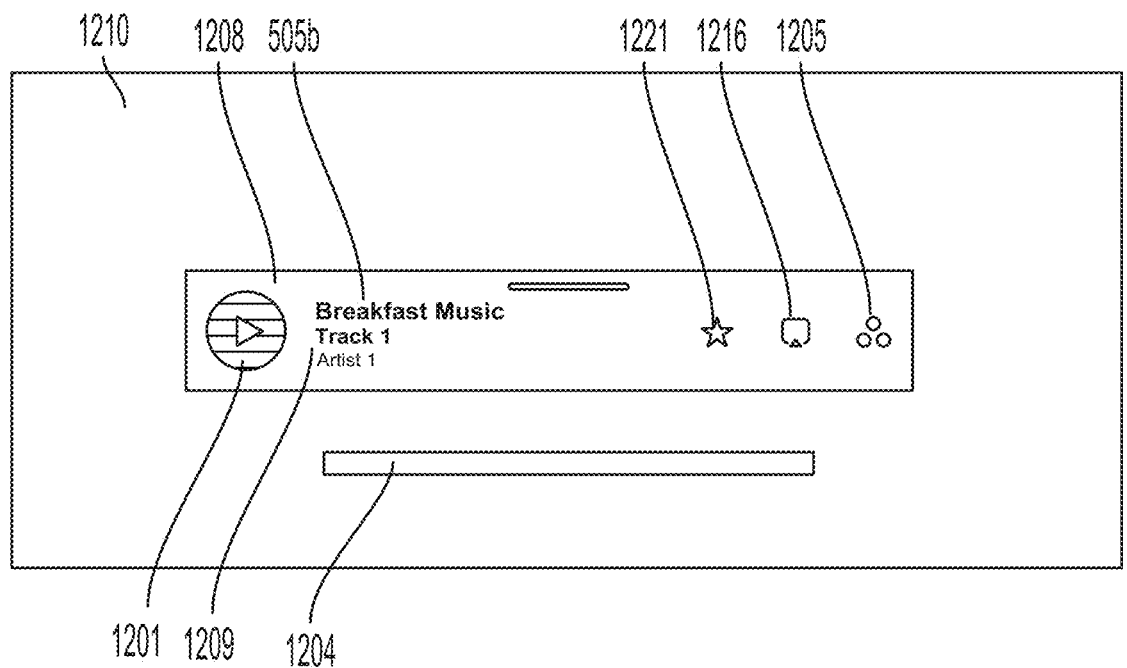
FIG. 12 is a schematic diagram of another example user interface on a playback device.

Turning to FIG. 12, another example hardware user interface is shown on a playback device 1210, which includes a graphical display 1208 coupled with a tactile volume control bar 1204. In this regard, the volume control bar 1204 may be similar to the tactile volume control bars discussed in the examples above. In FIG. 12, the graphical display 1208 is presenting a now playing screen that includes an indication 1209 of the currently-playing media item along with a selectable play/pause indicator 1201. Further, the name of the second quickstart 505b is displayed, indicating that the second quickstart 505b was selected to initiate playback. Additionally, the text of the second quickstart's name and the play/pause indicator may both be colored red, for further indicate that the second quickstart 505b was selected. A user may skip forward and backward by swiping horizontally across the graphical display 1208, as in previous examples. The now playing screen shown in FIG. 12 also includes a star icon 1221 for tagging the currently playing song, a grouping indicator 1216 for accessing a grouping menu, and a quickstarts icon 1205 for accessing a quickstarts menu, as discussed further below.

Figure 12A:
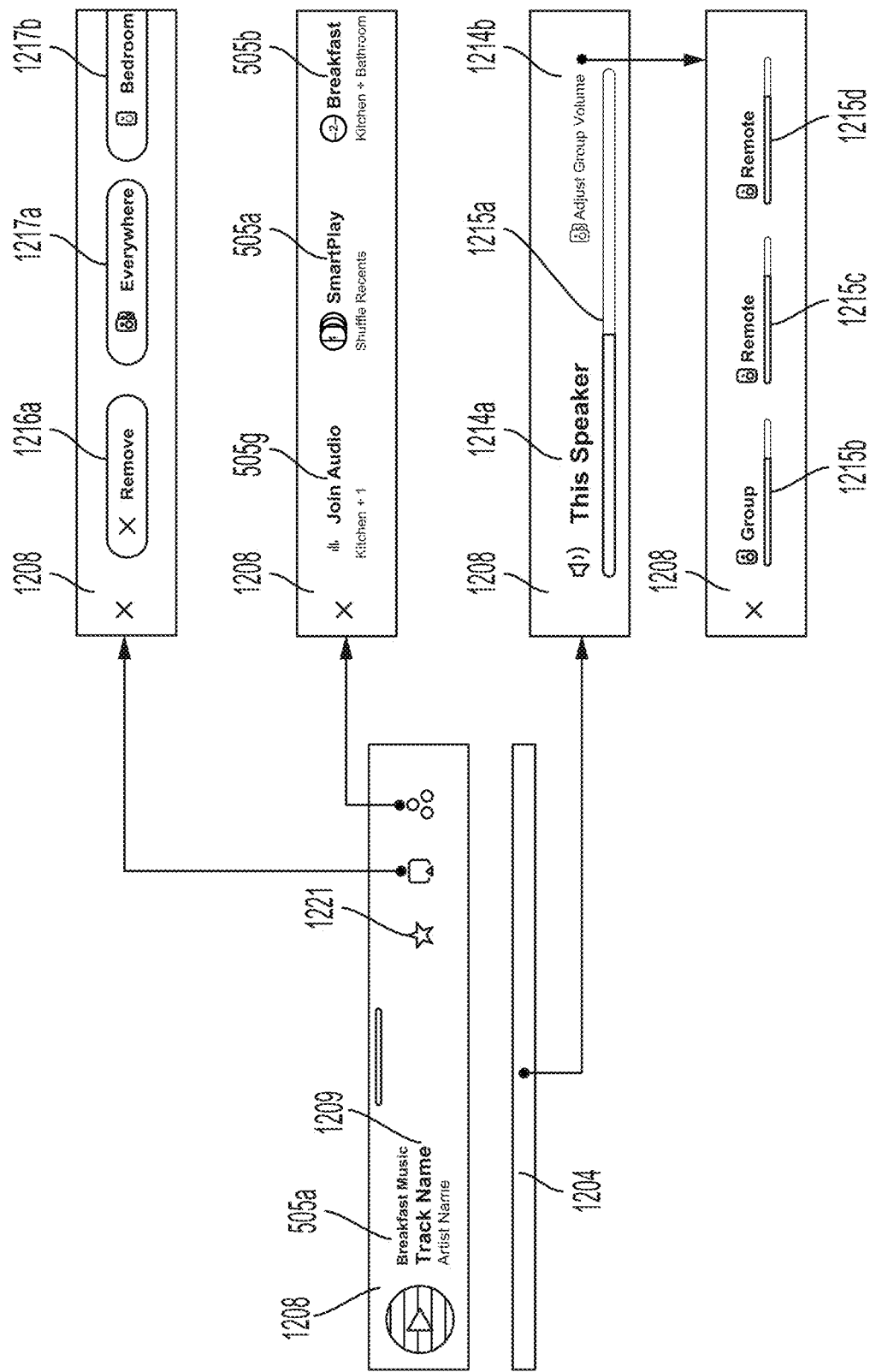
FIG. 12A shows example navigations between various screens presented on a graphical display of the example user interface of FIG. 12.

FIG. 12A depicts a schematic diagram of example navigations between different screens on the graphical display 1208, starting from the now playing screen shown on the left. For example, selecting the grouping indicator 1216 may cause the graphical display 1208 to present the grouping menu shown in FIG. 12A. There, the user may select an ungrouping icon 1216a to remove the playback device 1210 from a group in which it is currently a member. Further, the grouping menu may include a list of available playback devices with which the playback device 1210 may be grouped, represented by indications 1217a, 1217b, and so on. The list of playback devices available for grouping may be horizontally scrollable, similar to the vertically scrollable examples above.

As another example, if the user selects the quickstarts icon 1205 from the now playing screen, the graphical display 1208 may present a quickstarts menu as shown in FIG. 12A, which may take the form of a horizontally scrollable list, as seen in prior examples. For instance, the quickstarts menu may include the "Join Audio" SmartPlay quickstart 505g discussed above with respect to FIG. 10A, as well as the previously discussed quickstarts 505a, 505b, and so on.

As yet another example, if the user manipulates the volume control bar 1204 to make a relative volume adjustment, the graphical display 1208 may present a volume control screen, as shown in FIG. 12A. Like previous examples, the volume control screen may include a linear volume indication 1215a that represents the absolute volume of the playback device 1210 and is directly selectable by the user to quickly control the volume of the playback device 1210 on an absolute scale.

Further, the volume control screen includes a local volume icon 1214a and a group volume icon 1214b, which the user may use to navigate between controlling the individual volume of the playback device 1210 and the group volume. Selecting the group volume icon 1214*b* may cause the graphical display 1208 to present a linear volume indication 1215*b* for the composite group volume as well as linear volume indications 1215*c*, 1215*d*, and so on, for each individual playback device in the group. As in the example of FIG. 11B, each of the group volume indications shown in FIG. 12B may be directly manipulated by the user to make absolute volume adjustments among the group members.

In some implementations, the graphical display 1208 of the playback device 1210 may transition to an idle or sleep state after a period of non-use, and/or when the playback device 1210 is not playing back media content. In the sleep state, the graphical display 1208 may remain blank until it detects a trigger to exit the sleep state. As one example, a user may touch the graphical display 1208 to wake it up. As another example, the playback device 1210 may include one or more sensors that may be used for motion detection (e.g., one or more microphones) to determine when a user has approached the playback device 1210, similar to the playback device 910 discussed above. This type of motion detection may additionally or alternatively be used as a trigger to wake up the graphical display 1208.

Upon wake up, the graphical display 1208 may display different information depending on the state of the playback device 1210. For example, if the playback device 1210 is currently playing back media content and/or media content is queued for playback, the graphical display 1208 may present a now playing screen that includes the indication 1209 of the currently-playing (or next in queue) media item along with a selectable play/pause indicator 1201.

Figure 12B:
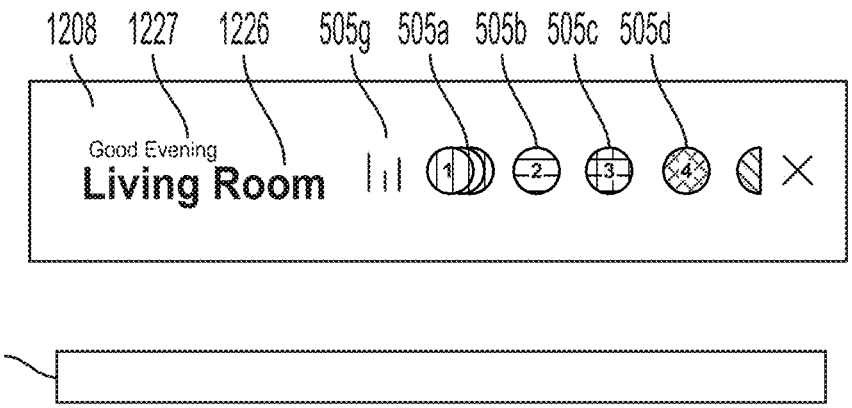
FIG. 12B shows an example screen presented on the graphical display of the example user interface of FIG. 12.

As another possibility, if the playback device 1210 is not playing back any media content and no content is queued for playback (or if media content is queued but has not been played by the playback device 1210 for a threshold period of time, etc.), the graphical display 1208 of the playback device 1210 may initially present a condensed version of the quickstarts menu, as shown in FIG. 12B. In this regard, each quickstart in the list may be represented by a relatively small icon that is numbered and colored according to the convention discussion above, and does not include the name of the quickstart or any other descriptive text. For instance, the user-defined second quickstart 505*b* may be represented by a red circle labeled with the number "2", and so on for the other user-defined quickstarts 505*c*, 505*d*, 505*e*, and 505*f*. Similarly, the SmartPlay quickstart 505*a* may be represented by a white icon of "stacked" circles (e.g., representing that the first quickstart is a SmartPlay quickstart that provides a shortcut to shuffled content) this is labeled with the number "1." Finally, the additional SmartPlay quickstart 505*g* discussed above to join another playback device may be represented by an icon that resembles a simple audio waveform. In some cases, the audio waveform icon may be animated to create the visual impression of media content playback by the other playback device(s) (which the playback device 1210 will join of the quickstart 505*g* is selected).

Figure 12C:
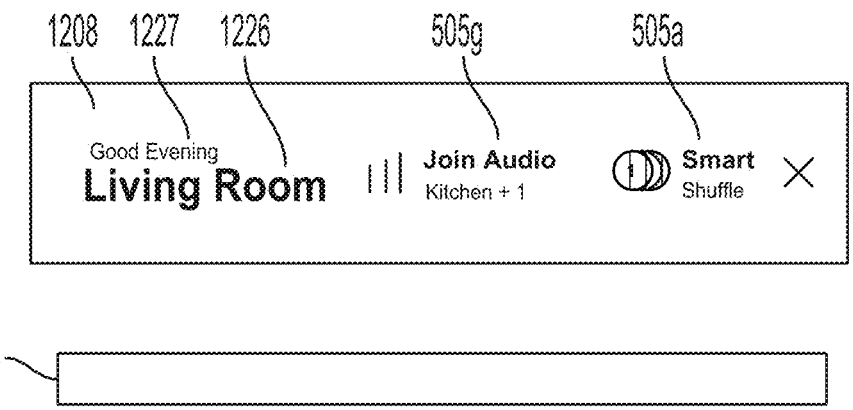
FIG. 12C shows another example screen presented on the graphical display of the example user interface of FIG. 12.

As will be appreciated by reviewing FIG. 12B, the condensed form of the quickstart icons allows for more of the icons to be visible on the graphical display 1208 at a given time. Thus, if a user wakes up the graphical display (e.g., by touching it, approaching it, etc.) and already knows that they want to initiate the quickstart 505*c* to listen to their favorite internet radio station, they may be able to do so easily without needing to scroll within the list of quickstarts. On the other hand, if a user does not make a selection within a predetermined period of time (e.g., 2 seconds, 5 seconds) after the graphical display 1208 wakes up, the playback device 1210 may update the graphical display 1208 to expand the quickstarts menu to include the name of each quickstart and other associated textual information, as shown in FIG. 12C. Although the additional information may take up more space and result in fewer quickstarts being visible at a given time on the graphical display 1208, requiring a user to scroll to reach some quickstarts (e.g., quickstart 505*c*), the additional information may assist user in making a content selection.

Referring now to FIGS. 12B-12C, when the playback device 1210 is not playing back any media content, the graphical display 1208 may present one or more indications of the current context of the playback device 1210. In some cases, the playback device 1210 (or another connected device) may use this context information to determine the media content that will be playing when selecting a given SmartPlay quickstart. For example, in FIGS. 12B-12C, the graphical display 1208 is presenting an indication 1226 that displays a location (e.g., a room) where the playback device 1210 is located, as well as an indication 1227 that displays the time of day. Other contextual indications are also possible.

Figure 12D:
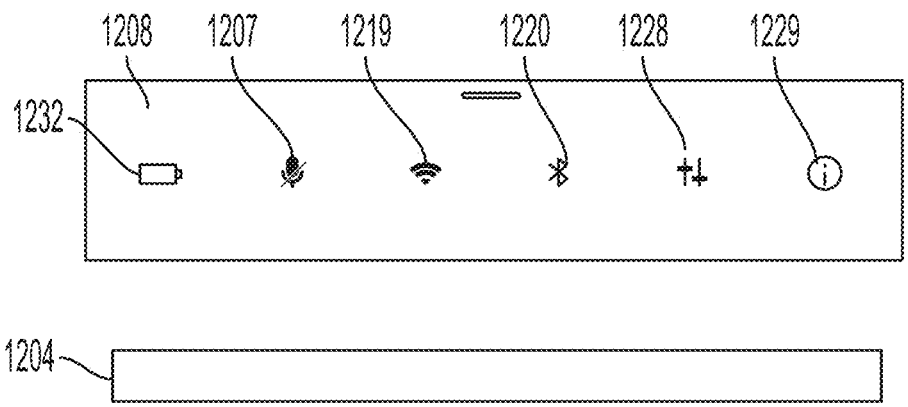
FIG. 12D shows another example screen presented on the graphical display of the example user interface of FIG. 12.

A user may navigate the graphical display 1208 of the playback device 1210 to screens and menus in addition to those discussed above. As one example, starting from the now playing screen shown in FIG. 12A, a user may swipe vertically up (or down) to reach a device status screen, as shown in FIG. 12D. The device status screen may include various indicators, such as a battery indicator 1232 if the playback device 1210 is a battery-powered device. The battery indicator 1232 may provide a visual indication of the battery status (e.g., 50% battery level, charging, etc.) and may be selectable to access additional battery information and power settings.

Figure 12E:
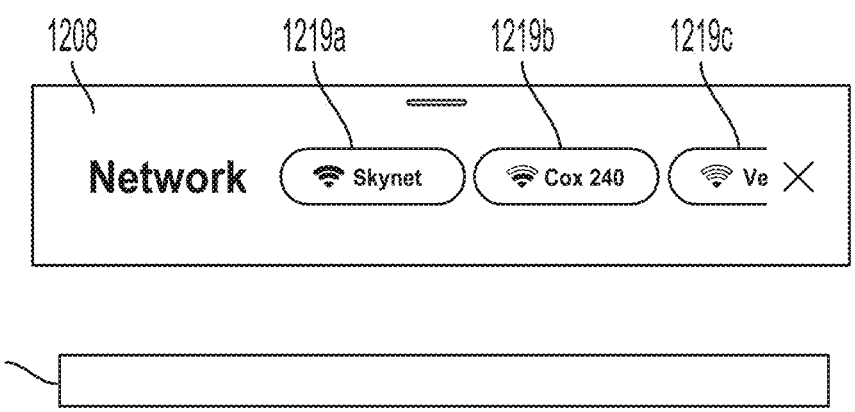
FIG. 12E shows another example screen presented on the graphical display of the example user interface of FIG. 12.

The device status screen shown in FIG. 12D may also include a microphone indicator 1207 if the playback device 1220 is equipped with microphones. The microphone indicator 1207 may displays a visual indication of current microphone status and may be selectable to turn the microphone(s) on or off. Still further, the device status screen may include a WiFi indicator 1219 that provides a visual indication of the WiFi status (e.g., on/off, connected/unconnected), of the playback device 1210. Additionally, the WiFi indicator 1219 may be selectable to cause the graphical display 1208 to present a network settings menu. FIG. 12E provides an example of such a menu and includes a list of detected wireless networks 1219*a*, 1219*b*, 1219*c*, and so on. From this menu, the user many be able to select a network to which the playback device 1210 should connect, which may be useful in situations where multiple known networks (e.g., a known 2.4 GHz network and a known 5.0 GHz network) are within range. Further, the network settings menu may facilitate network troubleshooting, particularly in situations where the playback device 1210 loses its network connection. Other network settings may also be available from the network settings menu.

Figure 12F:
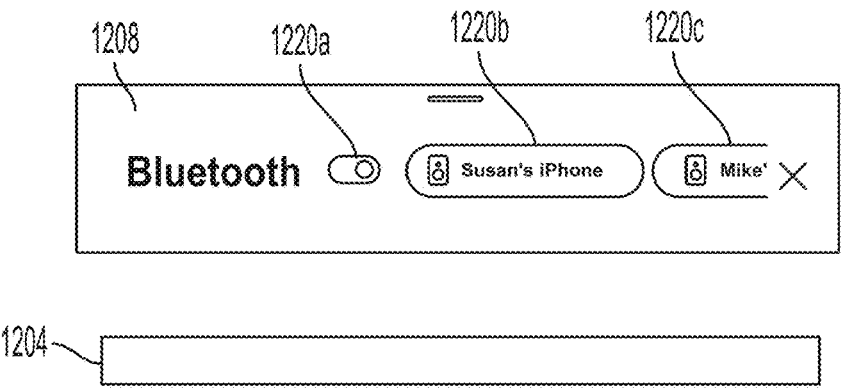
FIG. 12F shows another example screen presented on the graphical display of the example user interface of FIG. 12.

Similarly, the device status screen of FIG. 12D may also include a Bluetooth indicator 1220 that provides a visual indication of the Bluetooth status (e.g., on/off, connected/unconnected), of the playback device 1210. Additionally, the Bluetooth indicator 1220 may be selectable to cause the graphical display 1208 to present a Bluetooth settings menu. FIG. 12F provides an example of such a menu and includes a toggle 1220*a* for turning Bluetooth on/off, and a list of devices to which the playback device 1210 has previously connected, including devices 1220*b* and 1220*c*. Thus, the user may be able to select the device to which the playback device 1210 should connect, thus facilitating convenient switching between input sources without the need for a separate control device. The user may also be able to initiate a new Bluetooth connection from the Bluetooth settings menu. Other Bluetooth settings may also be available from the Bluetooth settings menu.

Figure 12G:
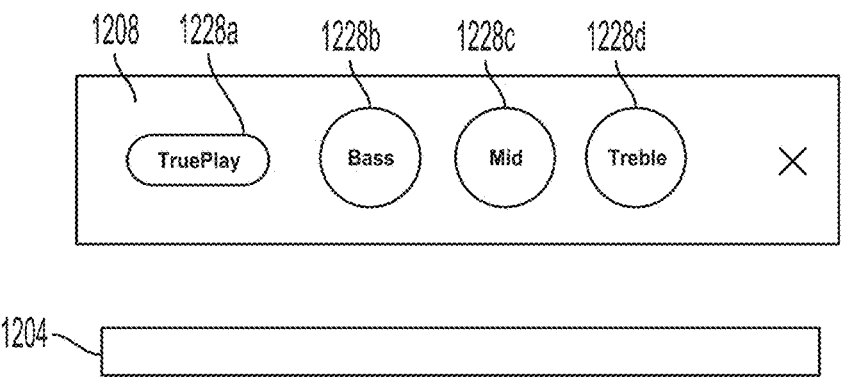
FIG. 12G shows another example screen presented on the graphical display of the example user interface of FIG. 12.

The device status screen shown in FIG. 12D may also include an EQ indicator 1228, which may be selectable to cause the graphical display 1208 to display an EQ settings menu, an example of which is shown in FIG. 12G. For instance, the EQ settings menu may include a selectable control 1228*a* for initiating a calibration procedure for the playback device 1210, as well as individual controls 1228*b*, 1228*c*, and 1228*d* for adjusting bass, mid-range, and treble frequency levels, respectively.

Figure 12H:
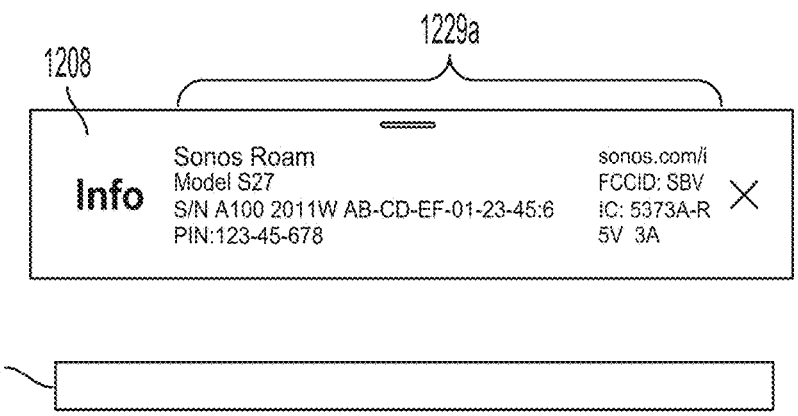
FIG. 12H shows another example screen presented on the graphical display of the example user interface of FIG. 12.

Still further, the device status screen shown in FIG. 12D may also include a device information indicator 1229, which may be selectable to cause the graphical display 1208 to display various types of device information, collectively shown in FIG. 12H as information 1229*a*. The device information may include details such as a model name/number, software version number, serial number, required agency labels (e.g., FCC labels) and/or a PIN that may be used for authentication during a secure setup procedure for the playback device 1210.

Figure 13:
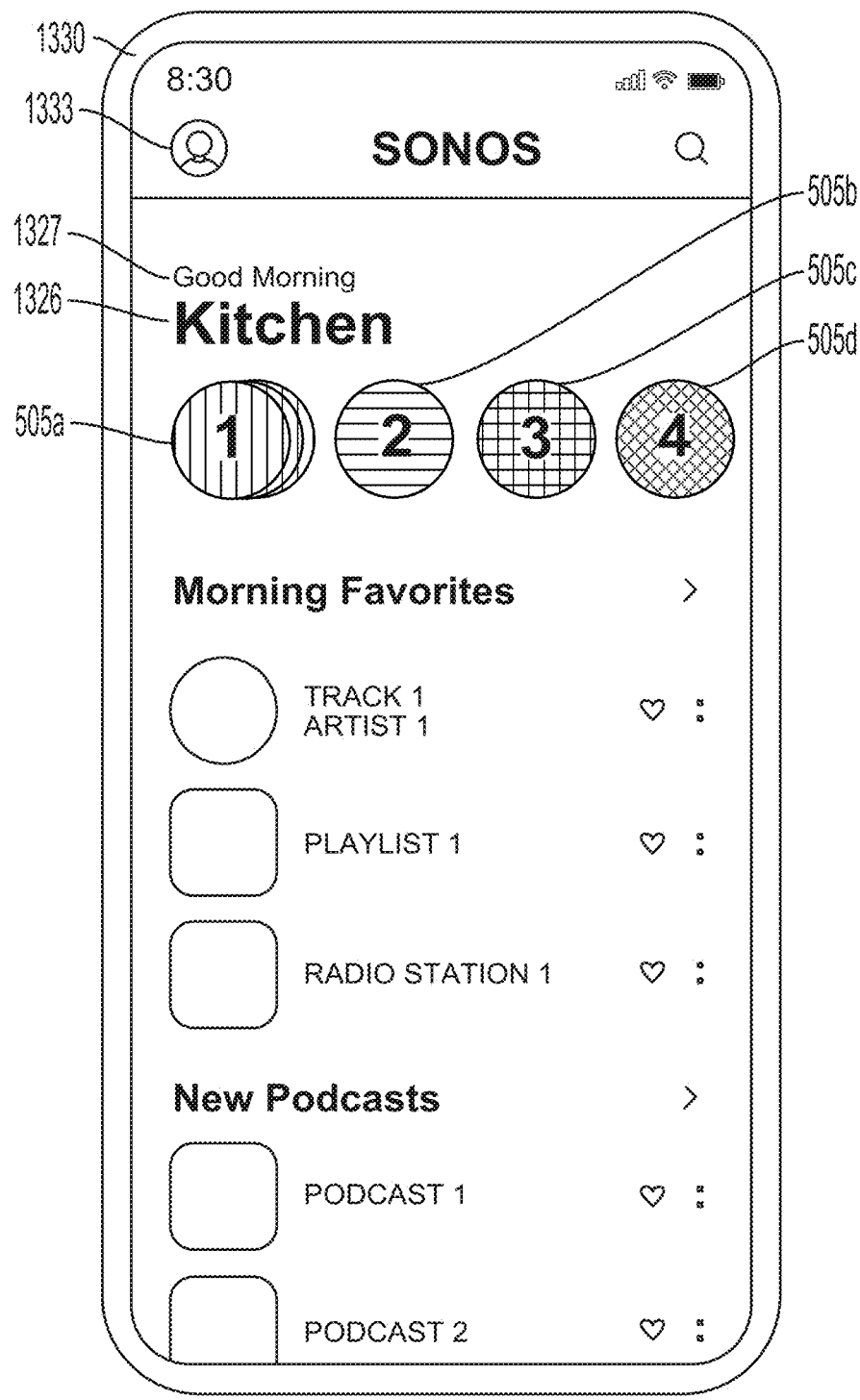
FIG. 13 is a is another schematic diagram of an example user interface on a control device.

Turning to FIG. 13, a schematic diagram of an example control device 1330 is shown, which may be similar to the control devices 130 discussed above and shown in FIG. 1H-1I.

Although the examples and discussion above has generally been focused on hardware user interfaces location on a playback device, FIG. 13 illustrates that some of the functionality discussed above may also be applied in a media playback system controller application running on a control device, such as control device 1330. Beneficially, this may provide for continuity between the different control experiences that may be available to users of the media playback system.

For example, the quickstarts discussed above may be available in a quickstarts menu or similar dashboard within the controller application. As shown in FIG. 13, the Smart-Play quickstart 505*a* from the previous examples may be selectable via an icon that is colored white and labeled with the number "1," consistent with the indications of the SmartPlay quickstart 505*a* displayed by the hardware user interfaces discussed above. Similarly, the second quickstart 505*b* may be selectable via a red icon labeled with the number "2," and so on for the other quickstarts in the list.

Further, the control device 1330 may display various indications of the current context of the control device 1330. For instance, the control device 1330 may display an indication 1333 of the user (e.g., a user profile) to whom the control device 1330 is registered, an indication 1327 of the current time of day, and an indication 1326 of the current location of the control device 1330, among other possibilities. Within a given media playback system, different users (e.g., with different registered user profiles) may each define different quickstarts, and SmartPlay quickstart options may be tailored to each individual user's listening habits and preferences, etc. Thus, the display shown in the control device 1330 in FIG. 13 may be different for each user.

However, while the active user profile is relatively easy to determine when a control device (e.g., a control device registered to a given user) is being used, the active user profile may be more difficult to determine when a hardware user interface of a playback device is utilized for content initiation. Nonetheless, a playback device may determine which user profile is most likely to be active—and thereby determine which list of quickstarts to present via its hardware user interface—in various ways. As one example, the playback device may select a user profile based on the proximity of the nearest registered control device to the playback device, which may be determined via WiFi signal strength, detection of ultrasonic tones, etc. As another example, the playback device may select a user profile based on historical playback data that shows which user profile plays back media content via the playback device most frequently, perhaps also filtered by time of day. As yet another example, the playback device may always default to the primary user profile for the media playback system. A playback device may select an active user profile in other ways as well.

Once the playback device selects an active user profile, the quickstarts menu may be populated accordingly, along with any associated indications on the hardware user interface. In some implementations, one or more of the example hardware user interfaces discussed in the examples herein may include an indication of the active user profile, similar to the indication 1333 shown in FIG. 13. Further, this indication may be selectable on the hardware user interface to switch to a different user profile, which may cause the playback device to become configured with a different list of quickstarts. Other examples for switching between active user profiles via a hardware user interface of a playback device are also possible.

In addition to user-based contextual information, Smart-Play content may also be based on time and location context. In this regard, the location of the control device 1330 may be determined differently than the location of a playback device, which may default to the room, zone, area, etc. to which the playback device has been assigned. Instead, the location of the control device 1330 may be estimated based on one or more of various factors such as location-based user activity, WiFi signal strength, or detection by the control device 1330 of an ultrasonic tone emitted by a nearby playback device (or vice versa). Other examples are also possible.

Based on one or more of these factors, it may be determined that the control device 1330 is most likely located in the Kitchen. Using this location-based contextual information (among other information), the control device 1330 may present content suggestions to the user. Further, any quickstart that the user selects via the control device 1330, and which does not have a designated playback device associated with it, will be initiated by the Kitchen playback device(s). For this reason, the media content associated with the SmartPlay quickstart 505*a* may be determined based at least in part on this type of location-based contextual information. For instance, consider a first example in which the control device 1330 is located in a Bedroom at 10 pm on a Friday, where a SmartPlay for a "Sleep Sounds" playlist may have a relatively high-probability of being selected, compared to a second example in which the control device 1330 is located on the Patio at 10 pm on a Friday, where a SmartPlay for a "Late Night Party" playlist is far more likely to be selected.

Figure 14:
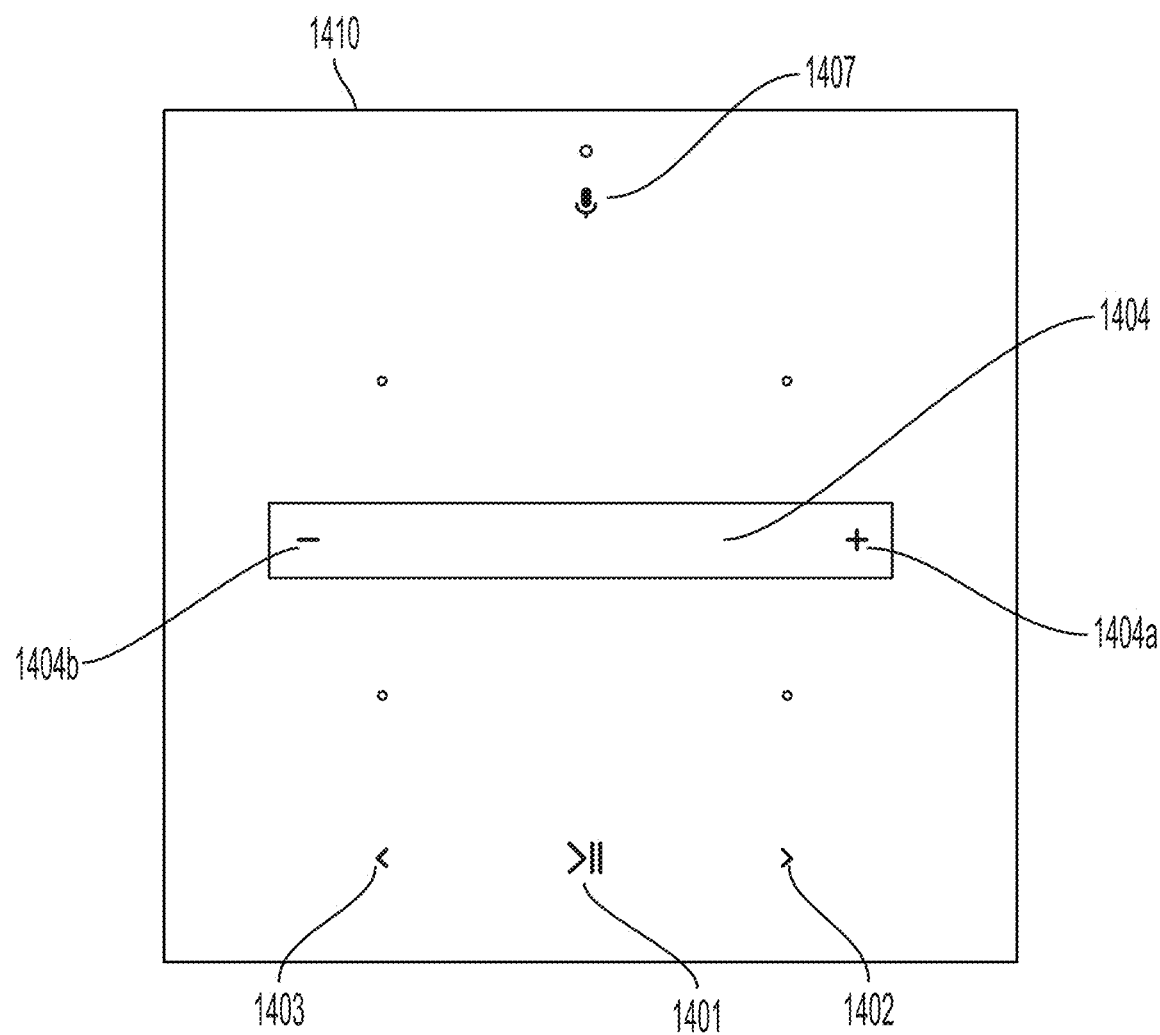
FIG. 14 is a schematic diagram of another example user interface on a playback device.

Turning to FIG. 14, another example hardware user interface is shown on a playback device 1410. The hardware user interface includes a play/pause button 1401, a skip forward button 1402, and a skip backward button 1403. On the playback device 1410, these three transport control buttons take the form of capacitive touch controls, however physical buttons are also possible. Also included is a microphone indicator 1407 that includes an associated LED, which may be illuminated when the microphone is active and unilluminated when it is not.

The hardware user interface of the playback device 1410 also includes a centrally-located volume control bar 1404, which may take the form of a groove or depression that includes a capacitive touch surface therein, similar to the volume control bars discussed in the examples above. However, the volume control bar 1404 also includes, at opposite ends of the groove, a volume up button 1404a and a volume down button 1404b. Whereas the volume control bar 1404 provides for a gradient-type of volume control by sliding a finger horizontally within the groove, the buttons 1404a and 1404b may provide for incremental volume adjustments that may be used for fine tuning. Still further, if a user performs a long-press on the volume up button 1404a, it may effect a rapid ramp up to the maximum volume (or user-defined volume limit) of the playback device 1410, and similarly with a rapid ramp down to zero volume if a long-press is performed on the volume down button 1404b.

Figure 14A:
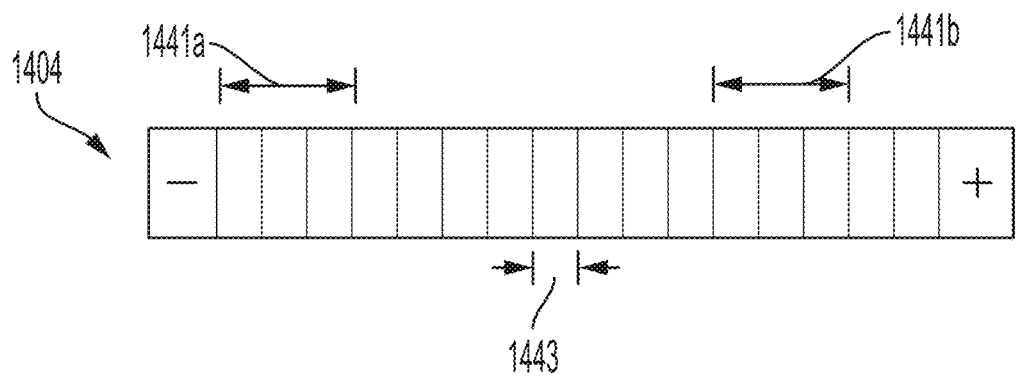
FIG. 14A is a schematic diagram of a volume control bar of the example user interface of FIG. 14.
Figure 14B:
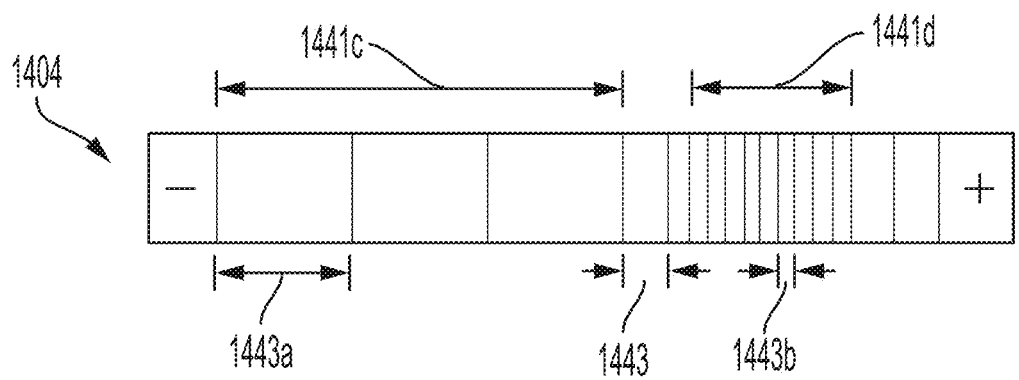
FIG. 14B is another schematic diagram of the volume control bar of FIG. 14.

As noted above, volume adjustments that are performed on the volume control bar 1404 by sliding a finger horizontally within the groove may be relative adjustments, meaning that volume levels are not tied to any specific location along the volume control bar 1404. Referring to FIG. 14B by way of example, if a user slides their finger a given distance at a first location 1441a on the volume control bar 1404, it would result in the same volume adjustment if the user slides their finger the same distance at a second location 1441b.

The level of volume change that results from sliding a finger across given distance may depend on various factors including the size of the playback device 1410, which may influence the available length of the volume control bar 1404 and the resulting volume scale that may be used. In general, however, a given distance (e.g., measured in millimeters (mm)) may correspond to a given percentage of volume adjustment. For instance, a slide distance of 20 mm may correspond to volume adjustment of 8% (e.g., an adjustment from 50% volume to 58% volume). To effect this volume scale, the playback device 1410 may process movements along the volume control bar 1404 in 5 mm increments, each of which may correspond to a 2% volume change. This can be seen by way of example in FIG. 14A, where the volume control bar 1404 is divided into equally spaced increments 1443.

In some implementations, the level of volume change that results from a given movement may also be based on the speed at which the user moved their finger, allowing the user to effectively alter the default volume scale that is used for the volume control bar 1404. Movements that are faster than a "default" speed may result in a greater relative volume change, while slower, more deliberate movements may result in a lesser relative volume change.

FIG. 14B shows one possible example of how the playback device 1410 may adjust the volume scale of the volume control bar 1404 based on the speed of a user's movements. In a first scenario, the playback device 1410 may detect that the user moved their finger relatively quickly over a distance 1441c. The speed of the user's movement (e.g., measured in mm per second), may imply that the user wishes to increase (or decrease) the volume quickly, and by a relatively large amount. Thus, the playback device 1410 may adjust the increment at which the user's movement is processed, as well as assign a new percentage volume change to the new macro-increments. For instance, as shown in FIG. 14B, the playback device 1410 may process the user's movements at macro-increments 1443a that are 15 mm, each of which may correspond to a 12% volume change. In this way, the user may achieve a greater volume change (by a factor of 2) than if the user had moved their finger the same distance at the default speed.

In the opposite scenario, the playback device 1410 may detect that the user moved their finger relatively slowly over a distance 1441d, as shown in FIG. 14B. In this case, the speed of the user's movement, may imply that the user wishes to increase (or decrease) the volume slowly, and in such a way that relatively small volume changes can be perceived. Thus, the playback device 1410 may adjust the increment at which the user's movement is processed, as well as assign a new percentage volume change to the new micro-increments. For instance, as shown in FIG. 14B, the playback device 1410 may process the user's movements at micro-increments 1443b that are 2.5 mm, each of which may correspond to a 0.5% volume change. Accordingly, the user may perceive a more granular volume adjustment than if the user had moved their finger the same distance at the default speed.

Numerous other volume control scenarios are also possible, including examples in which a user might change the speed at which they slide their finger within the volume control bar 1404. Further, the playback device 1410 might adjust the volume scale of the volume control bar 1404 based on the speed of a user's movements in other ways as well. Additional details regarding dynamic volume control of playback devices can be found, for example, in U.S. Application No. 63/412,009 filed on Sep. 30, 2022 and entitled "Dynamic Volume Control," which is incorporated by reference herein in its entirety.

Although the example hardware user interface of the playback device 1410 presents relatively less information to a user than the other hardware user interfaces discussed above, it may nonetheless incorporate many similar components, such as the tactile volume control bar 1404 and similarly oriented transport controls. In this way, the continuity of control experiences between playback devices and control devices discussed above may also extend between different models of playback devices that include different types of display screens (or no display screens at all), yet still provide for consistent and familiar functionality. This continuity of control experiences may extend to further applications as well, such as a desktop controller application, a smartwatch controller application, a control interface integrated into a head unit of a car, and so on.

With reference to FIG. 14 and the other hardware user interfaces discussed above, it may be appreciated that, depending on the size of a given playback device and the space thereon that may be devoted to the hardware user interface, certain controls may be spaced closely enough to one another that accidental touches might occur, leading to unintended control commands. For example, a user might be intending to touch the volume control bar 1404, but their finger may accidentally touch another button, such as the skip forward button 1402 (or the skip backward button 1403), as the user reaches for the volume control bar 1404. Skipping forward (or backward) may represent a relatively disruptive mistake, and therefore it may be desirable to mitigate these types of unintentional touches of the capacitive sensors discussed herein.

The types of accidental touches may be mitigated in various ways. As one example, a given playback device, such as the playback device 1410 or any of the other playback devices discussed herein, may implement a brief delay (e.g., one half of a second) after it detects a touch input via its hardware user interface indicating a skip forward or a skip backward command. If another touch input, such as a touch input corresponding to a volume control command, is received during the delay, the playback device 1410 may disregard the skip command, as it may be assumed to be accidental. On the other hand, if the playback device 1410 does not detect another touch input within the delay time period, it may be assumed that the skip command was intentional, and the playback device 1410 may execute the command accordingly.

Additionally, or alternatively, the playback device 1410 may modify the default behavior of skip forward and skip backward commands when a touch input indicating one of those commands is received within a very short time period of a touch input indicating a command to skip in the opposite direction. In these scenarios, the playback device 1410 may operate under an assumption that a user who inputs a first skip command, and then very quickly (e.g., within three seconds) inputs a second skip command in the opposite direction, is correcting the first command, which was accidental. Therefore, the playback device 1410 may execute the second command, but cause playback to resume at the same playback position within the audio content that was playing when the first command was received.

For instance, the playback device 1410 that is playing back audio content may receive a touch input indicating a skip forward command. The playback device 1410 may execute the command, skipping the audio content forward to the next track. Within three seconds, the playback device 1410 may then receive a touch input indicating a skip backward command. In this situation, it may be assumed that the skip forward command was accidental/unintentional. Under normal circumstances, the skip backward command may return to the start of the previous track, which can be a frustrating user experience if, for example, playback of the previous track was part-way through when the accidental/unintentional skip forward input was received. Therefore, in this case of an accidental/unintentional skip forward command, the playback device 1410 may execute the skip backward command, but instead of restarting the previous track, the playback device 1410 may resume playback of the previous track at that part-way point when the accidental/unintentional skip forward input was received. In some cases, playback may be returned to a point in the previous track slightly before (e.g., 1-2 seconds before) the part-way point. In a further example, the playback device 1410 may resume playback at the partway point only if a certain duration or percentage (30 seconds, 10%, etc.) of the previous track had already been played back. As such, if the previous track had just started when the accidental/unintentional skip forward was received, the playback device 1410 may still restart the previous track in response to the skip backward command.

In the examples discussed above, many of the input controls on the example hardware interfaces take the form of capacitive touch control buttons. Accordingly, many of the playback devices discussed herein may have relatively few physical buttons. Further, many of the example hardware interfaces discussed herein include relatively few capacitive touch buttons. As a result, there may be relatively few ways to provide inputs on the playback device to facilitate commands that are not related to playback of audio content. For example, it may be necessary at various times to execute one or more utility functions on a given playback device, such as a factory reset, or entering one of several other playback device states (e.g., an authorize mode that may be used during a setup process, a diagnostic mode that may be used to troubleshooting and/or debugging, an open AP (access point) that may be used for WiFi reconfigurations, etc.).

For account for these situations, a playback device may be configured to recognize inputs that involve a simultaneous button press of two or more capacitive touch buttons (e.g., a play/pause button and a skip forward button). Each input may be unique depending on the combination of buttons that is pressed and the duration for which they are held, among other examples. Accordingly, the playback device may maintain a relatively lean hardware user interface with relatively few buttons, but still enable the necessary inputs to provide all required functionality.

It should be understood that, for each of the example hardware user interfaces discussed herein, the particular features and capabilities described above and shown in the Figures are not limited to the specific examples in which they were discussed. Rather, each of the example hardware user interfaces discussed herein may include more, or fewer, of the disclosed features, which may be assembled in any combination and may be embodied in any number of different playback devices, control devices, and/or other devices that may facilitate control of a media playback system.

For the flowcharts and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 5-8 may represent circuitry and/or machinery that is wired or arranged to perform the specific functions in the process.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A playback device comprising:
a graphical display;
a capacitive volume control disposed on a housing of the playback device;
at least one processor;
at least one non-transitory computer-readable medium; and
program instructions stored on the at least one non-transitory computer-readable medium that are executable by the at least one processor to cause the playback device to:
while the graphical display is in a sleep state, detect, via one or more proximity sensors, that a user is proximate to the playback device;
based on detecting that the user is proximate to the playback device, cause the graphical display to (i) exit the sleep state and (ii) present a graphical user interface (GUI) comprising a list of selectable quick start icons, each selectable quick start icon in the list comprising a selectable icon corresponding to respective media content and a respective command to begin playback of the respective media content, wherein the list does not include information identifying the respective media content;
determine that a predetermined period of time has passed after causing the graphical display to exit the sleep state;
based on determining that the predetermined period of time has passed after causing the graphical display to exit the sleep state, update the graphical display such that the list of selectable quick start icons includes information identifying the respective media content corresponding to each selectable quick start icon in the list;
detect an input selecting one of the selectable quick start icons via the graphical display; and
based on detecting the input selecting one of the selectable quick start icons via the graphical display, begin to play back the respective media content corresponding to the selected one of the selectable quick start icons.

2. The playback device of claim 1, further comprising program instructions stored on the at least one non-transitory computer-readable medium that are executable by the at least one processor to cause the playback device to:
after detecting that the user is proximate to the playback device, dynamically determine the respective media content corresponding to at least one of the selectable quick start icons based on contextual information.

3. The playback device of claim 2, wherein:
the playback device is a first playback device;
one of the selectable quick start icons in the list corresponds to a command to join a second playback device for synchronous playback of media content currently being played by the second playback device; and
the program instructions that are executable by the at least one processor to cause the playback device to dynamically determine the respective media content corresponding to at least one of the selectable quick start icons based on contextual information comprise program instructions that are executable by the at least one processor to cause the playback device to dynamically determine the media content currently being played by the second playback device.

4. The playback device of claim 2, wherein the program instructions that are executable by the at least one processor to cause the playback device to dynamically determine the respective media content corresponding to at least one of the selectable quick start icons based on contextual information comprise program instructions that are executable by the at least one processor to cause the playback device to dynamically determine the respective media content corresponding to one of the selectable quick start icons based on a time of day.

5. The playback device of claim 1, wherein the GUI is a first GUI, the playback device further comprising program instructions stored on the at least one non-transitory computer-readable medium that are executable by the at least one processor to cause the playback device to:
based on detecting the input selecting one of the selectable quick start icons via the graphical display, cause the graphical display to replace the first GUI with a second GUI comprising status information for the playback device, the status information comprising (i) an indication of a name for the playback device and (ii) an indication that the media content corresponding to the selected one of the selectable quick start icons is now being played back by the playback device.

6. The playback device of claim 5, wherein each selectable quick start icon in the list is displayed in a different corresponding color, and wherein the program instructions that are executable by the at least one processor to cause the playback device to cause the graphical display to replace the first GUI with the second GUI comprising status information for the playback device comprise program instructions that are executable by the at least one processor to cause the playback device to cause the graphical display to replace the first GUI with the second GUI comprising status information further comprising (iii) an indication of the color corresponding to the selected one of the selectable quick start icons.

7. The playback device of claim 1, wherein the one or more proximity sensors comprise one or more ultrasonic microphones of the playback device.

8. The playback device of claim 1, wherein the capacitive volume control comprises a depression in the housing of the playback device.

9. The playback device of claim 8, wherein the depression in the housing of the playback device comprises a linear depression.

10. The playback device of claim 1, further comprising program instructions stored on the at least one non-transitory computer-readable medium that are executable by the at least one processor to cause the playback device to:
based on detecting a touch input via the capacitive volume control, cause the graphical display to present a visual representation of a volume level of the playback device, wherein the volume level of the playback device is adjustable via one or more inputs to either (i) the capacitive volume control or (ii) the visual representation of the volume level on the graphical display.

11. The playback device of claim 10, wherein the playback device is a first playback device and wherein the visual representation of the volume level of the playback device further comprises a selectable option to display a visual representation of a respective volume level for at least a second playback device that is grouped with the first playback device for synchronous playback of audio content.

12. The playback device of claim 11, further comprising program instructions stored on the at least one non-transitory computer-readable medium that are executable by the at least one processor to cause the playback device to:
display the visual representation of the respective volume level for at least the second playback device that is grouped with the first playback device for synchronous playback of audio content;
receive an input to the visual representation of the respective volume level for the second playback device on the graphical display; and
based on the received input to the visual representation of the respective volume level for the second playback device on the graphical display, cause the second playback device to adjust its volume level.

13. A non-transitory computer-readable medium, wherein the non-transitory computer-readable medium is provisioned with program instructions that, when executed by at least one processor, cause a playback device to:
while a graphical display of the playback device is in a sleep state, detect, via one or more proximity sensors, that a user is proximate to the playback device;
based on detecting that the user is proximate to the playback device, cause the graphical display to (i) exit the sleep state and (ii) present a graphical user interface (GUI) comprising a list of selectable quick start icons, each selectable quick start icon in the list comprising a selectable icon corresponding to respective media content and a respective command to begin playback of the respective media content, wherein the list does not include information identifying the respective media content;
determine that a predetermined period of time has passed after causing the graphical display to exit the sleep state;
based on determining that the predetermined period of time has passed after causing the graphical display to exit the sleep state, update the graphical display such that the list of selectable quick start icons includes information identifying the respective media content corresponding to each selectable quick start icon in the list;
detect an input selecting one of the selectable quick start icons via the graphical display; and
based on detecting the input selecting one of the selectable quick start icons via the graphical display, begin to play back the respective media content corresponding to the selected one of the selectable quick start icons.

14. The non-transitory computer-readable medium of claim 13, wherein the non-transitory computer-readable medium is also provisioned with program instructions that, when executed by at least one processor, cause the playback device to:
after detecting that the user is proximate to the playback device, dynamically determine the respective media content corresponding to at least one of the selectable quick start icons based on contextual information.

15. The non-transitory computer-readable medium of claim 14, wherein:
the playback device is a first playback device;
one of the selectable quick start icons in the list corresponds to a command to join a second playback device for synchronous playback of media content currently being played by the second playback device; and
the program instructions that, when executed by at least one processor, cause the playback device to dynamically determine the respective media content corresponding to at least one of the selectable quick start icons based on contextual information comprise program instructions that, when executed by at least one processor, cause the playback device to dynamically determine the media content currently being played by the second playback device.

16. The non-transitory computer-readable medium of claim 14, wherein the program instructions that, when executed by at least one processor, cause the playback device to dynamically determine the respective media content corresponding to at least one of the selectable quick start icons based on contextual information comprise program instructions that, when executed by at least one processor, cause the playback device to dynamically determine the respective media content corresponding to one of the selectable quick start icons based on a time of day.

17. The non-transitory computer-readable medium of claim 13, wherein the GUI is a first GUI, and wherein the non-transitory computer-readable medium is also provisioned with program instructions that, when executed by at least one processor, cause the playback device to:
based on detecting the input selecting one of the selectable quick start icons via the graphical display, cause the graphical display to replace the first GUI with a second GUI comprising status information for the playback device, the status information comprising (i) an indication of a name for the playback device and (ii) an indication that the respective media content corresponding to the selected one of the selectable quick start icons is now being played back by the playback device.

18. The non-transitory computer-readable medium of claim 13, wherein the non-transitory computer-readable medium is also provisioned with program instructions that, when executed by at least one processor, cause the playback device to:
  based on detecting a touch input via a capacitive volume control disposed on a housing of the playback device, cause the graphical display to present a visual representation of a volume level of the playback device, wherein the volume level of the playback device is adjustable via one or more inputs to either (i) the capacitive volume control or (ii) the visual representation of the volume level on the graphical display.

19. The non-transitory computer-readable medium of claim 18, wherein the playback device is a first playback device and wherein the visual representation of the volume level of the playback device further comprises a selectable option to display a visual representation of a respective volume level for at least a second playback device that is grouped with the first playback device for synchronous playback of audio content.

20. A method carried out by a playback device, the method comprising:
  while a graphical display of the playback device is in a sleep state, detecting, via one or more proximity sensors, that a user is proximate to the playback device;
  based on detecting that the user is proximate to the playback device, causing the graphical display to (i) exit the sleep state and (ii) present a graphical user interface (GUI) comprising a list of selectable quick start icons, each selectable quick start icon in the list corresponding to respective media content and a respective command to begin playback of the respective media content, wherein the list does not include information identifying the respective media content;
  determining that a predetermined period of time has passed after causing the graphical display to exit the sleep state;
  based on determining that the predetermined period of time has passed after causing the graphical display to exit the sleep state, updating the graphical display such that the list of selectable quick start icons includes information identifying the respective media content corresponding to each selectable quick start icon in the list;
  detecting an input selecting one of the selectable quick start icons via the graphical display; and
  based on detecting the input selecting one of the selectable quick start icons via the graphical display, beginning to play back the respective media content corresponding to the selected one of the selectable quick start icons,
  detecting an input selecting one of the selectable quick start icons via the graphical display; and
  based on detecting the input selecting one of the selectable quick start icons via the graphical display, beginning to play back the respective media content corresponding to the selected one of the selectable quick start icons.

* * * * *